US012717633B2

(12) United States Patent
Géhberger et al.

(10) Patent No.: US 12,717,633 B2
(45) Date of Patent: Aug. 25, 2026

(54) HANDLING EXECUTION OF FUNCTIONS

(71) Applicant: Telefonaktiebolaget LM Ericsson (publ), Stockholm (SE)

(72) Inventors: Dániel Géhberger, Montreal (CA); Zoltán Richárd Turányi, Szentendre (HU); Roch Glitho, Ville Saint Laurent (CA); Mohammad Abu Lebdeh, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 721 days.

(21) Appl. No.: 17/912,406

(22) PCT Filed: Mar. 23, 2020

(86) PCT No.: PCT/IB2020/052702
§ 371 (c)(1),
(2) Date: Sep. 16, 2022

(87) PCT Pub. No.: WO2021/191655
PCT Pub. Date: Sep. 30, 2021

(65) Prior Publication Data
US 2023/0185618 A1 Jun. 15, 2023

(51) Int. Cl.
*G06F 9/50* (2006.01)
*G06F 9/52* (2006.01)

(52) U.S. Cl.
CPC ............ *G06F 9/5033* (2013.01); *G06F 9/526* (2013.01)

(58) Field of Classification Search
CPC ....... G06F 9/5033; G06F 9/5088; G06F 9/526
USPC .......................................................... 718/101
See application file for complete search history.

(56) References Cited

U.S. PATENT DOCUMENTS

| | | | |
|---|---|---|---|
| 9,940,162 B2 | 4/2018 | Harris et al. | |
| 10,628,626 B1 * | 4/2020 | Gangwar | G06F 30/392 |
| 2015/0347509 A1 | 12/2015 | Ahmed et al. | |

(Continued)

FOREIGN PATENT DOCUMENTS

| | | |
|---|---|---|
| WO | 2017/207049 A1 | 12/2017 |
| WO | 2019231364 A1 | 12/2019 |
| WO | 2021/098962 A1 | 5/2021 |

OTHER PUBLICATIONS

International Search Report and Written Opinion dated Dec. 3, 2020 for International Application No. PCT/IB2020/052702 filed Mar. 23, 2020; consisting of 19 pages.

(Continued)

*Primary Examiner* — Pierre Vital
*Assistant Examiner* — Daniel Trainor
(74) *Attorney, Agent, or Firm* — Sonoda & Kobayashi Intellectual Property; Darren M. Gardner

(57) ABSTRACT

There is provided a method performed by an entity for handling execution of functions in a function-as-a-service (FaaS) system. The FaaS system includes one or more nodes on which functions are executable. The method includes grouping functions into a group of functions to be executed on a single one of the one or more nodes. The grouping is based on information from the one or more nodes. The information is indicative of which functions access which data during execution of the functions and each function of the group accesses the same data as at least one other function of the group.

18 Claims, 8 Drawing Sheets

(56) References Cited

U.S. PATENT DOCUMENTS

| | | | | |
|---|---|---|---|---|
| 2021/0232440 | A1* | 7/2021 | Ranjan .................. | G06F 9/5005 |
| 2021/0263779 | A1* | 8/2021 | Haghighat ............ | G06F 9/5061 |

OTHER PUBLICATIONS

Jianhai Chen et al: "AAGA: Affinity-Aware Grouping for Allocation of Virtual Machines", 2013 IEEE 27th International Conference on Advanced Information Networking and Applications, IEEE, Mar. 25, 2013 (Mar. 25, 2013), pp. 235-242, XP032426169; consisting of 9 pages.

Anshudeep_2018—Data Locality in Hadoop; Tech Tutorials and posts and Java, Spring, Hadoop and many More. Java Code examples and Interview questions. Spring Code examples; https://www.netjstech.com/2018/04/data-locality-in-hardoop.html; Jun. 2018; consisting of 3 pages.

Microsoft_2021_Getting_started_with_Azure_Functions; https://docs/microsoft.com/en-us/azure/azure-functions/functions-get-started? pivots+programing-language-csharp##create-a-funtion-app; Jul. 12, 2021; consisting of 3 pages.

Dal: A Locality-Optimiaing Distributed Shared Memory System Ericsson Research—Gabor Nemeth; Danniel Gehberger, Pete Matray; NEMETH 2017 Dal a Locality Optimizing Distributed Shared Memory System; consisting of 6 pages.

* cited by examiner

100

Grouping functions into a group of functions to be executed on a single one of one or more nodes

200

Generating information indicative of which functions access which data during execution of the functions

HANDLING EXECUTION OF FUNCTIONS

CROSS-REFERENCE TO RELATED APPLICATIONS

This application is a Submission Under 35 U.S.C. § 371 for U.S. National Stage Patent Application of International Application Number: PCT/IB2020/052702, filed Mar. 23, 2020 entitled "HANDLING EXECUTION OF FUNCTIONS," the entirety of which is incorporated herein by reference.

TECHNICAL FIELD

The disclosure relates to a method for handling execution of functions in a function-as-a-service (FaaS) system and an entity configured to operate in accordance with the method. The disclosure also relates to a method to assist the entity with handling execution of the functions in the FaaS system and a node configured to operate in accordance with that method.

BACKGROUND

Traditional execution models in cloud computing include infrastructure-as-a-service (laaS) systems, where a user of the cloud needs to provide virtual machines for the execution of a function. More recent execution models in cloud computing include function-as-a-service (FaaS) systems.

In FaaS systems, a user of the cloud only needs to upload functions as the execution environment is provided by the operator of the platform, together with proper packaging, triggering, monitoring, dimensioning and scaling rules. The main advantage of FaaS systems is that developers can focus purely on the application logic and leave the mechanics of operation to the system. In FaaS systems, functions are attached to pre-defined triggering events and are executed when those events occur. Such events can be, for example, when a hypertext transfer protocol (HTTP) query arrives at a node of a FaaS system, a given key is changed in a database storing key values, or a given time elapses. Functions are required to be stateless by relying only on input data (e.g. HTTP body) and data that is externalised into databases.

There exist various open source and commercial FaaS systems. In open source FaaS systems, it is the responsibility of a data center operator to provide databases for state externalisation. As is understood in the art, state externalisation is where a state of a function (or, more generally, data to be accessed for execution of the function, e.g. variables and/or values used by the function) is not stored in a database assigned to the function, i.e. is not stored locally. Instead, the state of the function is stored in another database, which can be referred to as an external database. This external database is responsible for reliably and scalably storing the state of the function. In this way, when a client application fails, the state of the function is not lost, but is safely available for another (or restarted) instance of the client application. This allows "stateless" nodes, which do not store a state of the function between executions. However, it means that these nodes need to fetch the relevant state of the function from the external database each time they execute the function and then write the state of the function to the external database once the execution of the function is complete. In commercial FaaS systems, users can select from a wide range of databases for state externalisation. The most commonly used databases are key-value stores. As the FaaS model is becoming more and more widespread, complex applications are being designed following this approach. In practice, this means that, on the one hand, functions can be used to build up complex execution topologies and, on the other hand, multiple functions may work on the same set of externalised data.

In order to scale, a FaaS system usually comprises a plurality of nodes, such as a plurality of physical and/or virtual machines. The plurality of nodes of the FaaS system can be referred to as a FaaS cluster. The FaaS cluster forms a distributed system for executing functions. The FaaS cluster and the databases of the FaaS system are typically deployed to different physical nodes. As such, existing FaaS systems tend to suffer from data access latencies, since functions often need to remotely access data for their execution. This remote data access can cause an undesirable cross-communication overhead between the nodes running the FaaS platform (i.e. running the functions) and the nodes running the databases. This can be significant from both a performance and resource usage perspective. It has so far proven difficult to address these problems, particularly since the physical layout and/or state of some FaaS systems may change over time. For example, in an industrial internet of things (IoT) system, the externalised data may represent the physical state of the system (e.g. current position of autonomous robots, tools, etc.), which can be modified by various types of functions (e.g. robot control, camera feed analyser, distance measurement sensor handler, etc.).

There is thus a need for an improved technique, which is aimed at addressing at least some of the problems associated with existing algorithms.

SUMMARY

It is an object of the disclosure to obviate or eliminate at least some of the above-described disadvantages associated with existing techniques and provide an improved technique for handling execution of functions in a function-as-a-service (FaaS) system. In particular, existing FaaS systems do not seek to reduce data access latencies, which can result from the function executions being separate from the databases. Moreover, existing FaaS systems do not currently support the dynamic co-location of data and functions working on the same data, which would be beneficial from a performance point of view by reducing data access times.

Therefore, according to an aspect of the disclosure, there is provided a method for handling execution of functions in a FaaS system. The FaaS system comprises one or more nodes on which functions are executable. The method comprises grouping functions into a group of functions to be executed on a single one of the one or more nodes. The grouping is based on information from the one or more nodes. The information is indicative of which functions access which data during execution of the functions and each function of the group accesses the same data as at least one other function of the group.

There is thus provided an advantageous method for handling execution of functions in a FaaS system. In particular, by grouping functions that access the same data into a group of functions to be executed on a single node, data access latencies can be reduced and bandwidth usage can be decreased. In this way, the method can improve the performance of the functions and reduce the function execution time. This can improve the throughput since more functions can then be executed in a given time.

In some embodiments, grouping functions into a group of functions may comprise creating the group of functions to be executed on the single one of the one or more nodes. In some embodiments, grouping functions into a group of functions may comprise assigning at least one function to an existing group of functions to be executed on the single one of the one or more nodes. In this way, an optimum grouping of functions can be provided in a flexible way.

In some embodiments, if a function from one of at least two existing groups of functions accesses the same data as at least one function from another of the at least two existing groups of functions, grouping functions into a group of functions may comprise merging the at least two existing groups of functions into the group of functions to be executed on the single one of the one or more nodes. In this way, an optimum grouping of functions can be provided in a flexible way.

In some embodiments, merging the at least two existing groups of functions may comprise merging the at least two existing groups of functions into the one of the at least two existing groups of functions that comprises the most functions. In this way, any disturbance that may be caused during the merging is minimised.

In some embodiments, the method may comprise, if a function of the group of functions to be executed on the single one of the one or more nodes is located on another one of the one or more nodes, initiating movement of the function to the single one of the one or more nodes. In this way, data access latencies can be reduced.

In some embodiments, the method may comprise, if a timer signals that a predefined time period has elapsed since the grouping and, during the predefined time period, a function of the group of functions to be executed on the single one of the one or more nodes fails to access the same data as at least one other function of the group, removing the function from the group. Thus, any changes over time in terms of which functions are accessing the same data can be taken into account and groups can be broken up. This can prevent any unnecessarily overloading of the one or more nodes.

In some embodiments, the method may comprise initiating a reset of the timer each time the function of the group accesses the same data as at least one other function of the group. This can account for the fact that functions may not access the same data constantly and also the fact that the rate of function execution depends on the use-case, which may be different between functions. The timer can advantageously provide a grace period for keeping functions grouped.

In some embodiments, the method may comprise, in response to an update to the information, updating the grouping based on the updated information. In this way, the most appropriate grouping for the current situation can be provided in order to continually provide the earlier described advantages.

In some embodiments, each function may be grouped into the group of functions with one or more triggers, wherein the function is executable in response to the one or more triggers.

In some embodiments, the data accessed by each function of the group of functions to be executed on the single one of the one or more nodes may be stored on the single one of the one or more nodes. In this way, it can be ensured that data is local to the group of functions to avoid the need to remotely access data and thus enable even faster function executions. This further enables a higher throughput, since more functions can be executed in a given time.

In some embodiments, the method may comprise generating information indicative of the group of functions.

In some embodiments, the information indicative of the group of functions may comprise a graph in which each function of the group of functions to be executed on the single one of the one or more nodes may be connected to data that the function accesses during execution of the function. This graph advantageously provides a logical way of representing the grouping of functions and is also easy to manage.

In some embodiments, the method may comprise initiating transmission of the information indicative of the group of functions towards the single one of the one or more nodes.

In some embodiments, the method may comprise, if a load generated by execution of at least one function of the group of functions is greater than an available capacity of the single one of the one or more nodes, initiating generation of a replica of the at least one function to be executed on another one of the one or more nodes. In this way, the load can be distributed across nodes to avoid an overload situation and function execution time can be reduced, thereby further improving performance.

In some embodiments, each of the at least one function of the group of functions may access the same data during execution.

In some embodiments, the data accessed by the at least one function of the group of functions may be stored on the another one of the one or more nodes.

In some embodiments, the method may comprise initiating generation of a replica of each function of the group of functions to be executed on the another one of the one or more nodes. Thus, the load can be distributed across nodes in a controlled manner, thereby avoiding an overload situation and speeding up function execution time to further improve performance.

In some embodiments, execution of the replica of each function of the group of functions may be in response to a corresponding trigger on the single one of the one or more nodes.

In some embodiments, the trigger may provide a token, wherein the token may be associated with data to be accessed by the at least one function during execution of the at least one function and/or one of the one or more nodes on which the function is to be executed. This can advantageously assist with a controlled load balancing.

In some embodiments, the information indicative of which functions access which data during execution of the functions may exclude data that is accessed by a predefined number of functions in the FaaS system. This can advantageously prevent all functions ending up in the same group and thereby improve optimisation.

According to another aspect of the disclosure, there is provided an entity configured to operate in accordance with the method described earlier in respect of the entity. The entity thus provides the advantages discussed earlier in respect of the method performed by the entity. In some embodiments, the entity may comprise processing circuitry configured to operate in accordance with the method described earlier in respect of the entity. In some embodiments, the entity may comprise at least one memory for storing instructions which, when executed by the processing circuitry, cause the entity to operate in accordance with the method described earlier in respect of the entity. In some embodiments, the entity may be one or more nodes of the FaaS system or a node separate to the one or more nodes of the FaaS system.

According to another aspect of the disclosure, there is provided a method performed by a node of one or more nodes of a FaaS system to assist an entity with handling execution of functions on the one or more nodes. The method comprises generating information indicative of which functions access which data during execution of the functions on the node. The generated information is for use by an entity to group functions into a group of functions to be executed on a single one of the one or more nodes. Each function of the group accesses the same data as at least one other function of the group.

There is thus provided an advantageous method to assist with handling execution of functions in a FaaS system. In particular, valuable information can be provided for use in grouping functions that access the same data into a group of functions to be executed on a single node, which can reduce data access latencies and decrease bandwidth usage. In this way, the method can assist with improving the performance of the functions and reducing the function execution time.

In some embodiments, the method may comprise initiating transmission of the generated information to the entity.

In some embodiments, the method may comprise acquiring, from the entity, information indicative of the group of functions.

In some embodiments, the information indicative of the group of functions may comprise a graph in which each function of the group of functions to be executed on the single one of the one or more nodes is connected to data that the function accesses during execution of the function. This graph advantageously provides a logical way of representing the grouping of functions and is also easy to manage.

In some embodiments, the node may be the single one of the one or more nodes.

In some embodiments, the method may comprise executing at least one function of the group of functions.

In some embodiments, the execution of each of the at least one function of the group of functions may be in response to a trigger.

In some embodiments, the method may comprise, if a load generated by execution of at least one function of the group of functions is greater than an available capacity of the node, generating a replica of the at least one function to be executed on another one of the one or more nodes. In this way, it is possible for the load to be distributed across nodes to avoid an overload situation and function execution time can be reduced, thereby further improving performance.

In some embodiments, each of the at least one function of the group of functions may access the same data during execution.

In some embodiments, the data accessed by the at least one function of the group of functions may be stored on the another one of the one or more nodes.

In some embodiments, the method may comprise generating a replica of each function of the group of functions to be executed on the another one of the one or more nodes. Thus, it is possible for the load to be distributed across nodes in a controlled manner, thereby avoiding an overload situation and speeding up function execution time to further improve performance.

In some embodiments, execution of the replica of each function of the group of functions may be in response to a corresponding trigger on the node.

In some embodiments, the trigger may provide a token, wherein the token may be associated with data to be accessed by the at least one function during execution of the at least one function and/or one of the one or more nodes on which the function is to be executed. This can advantageously assist with a controlled load balancing.

According to another aspect of the disclosure, there is provided a node configured to operate in accordance with the method described earlier in respect of the node. The node thus provides the advantages discussed earlier in respect of the method performed by the node. In some embodiments, the node may comprise processing circuitry configured to operate in accordance with the method described earlier in respect of the node. In some embodiments, the node may comprise at least one memory for storing instructions which, when executed by the processing circuitry, cause the node to operate in accordance with the method described earlier in respect of the node.

According to another aspect of the disclosure, there is provided a method performed by a FaaS system. The method may comprise the method performed described earlier in respect of the entity and/or the method described earlier in respect of the node. The method performed by the system thus provides the advantages discussed earlier in respect of the method performed by the entity and/or the node.

According to another aspect of the disclosure, there is provided a FaaS system. The system may comprise at least one entity as described earlier and/or at least one node as described earlier. The system thus provides the advantages discussed earlier in respect of the method performed by the entity and/or the node.

According to another aspect of the disclosure, there is provided a computer program comprising instructions which, when executed by processing circuitry, cause the processing circuitry to perform the method described earlier in respect of the entity and/or the node. The computer program thus provides the advantages discussed earlier in respect of the method performed by the entity and/or the node.

According to another aspect of the disclosure, there is provided a computer program product, embodied on a non-transitory machine-readable medium, comprising instructions which are executable by processing circuitry to cause the processing circuitry to perform the method described earlier in respect of the entity and/or the node. The computer program product thus provides the advantages discussed earlier in respect of the method performed by the entity and/or the node.

Therefore, an advantageous technique for handling execution of a function in a FaaS system is provided.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

As mentioned earlier, an advantageous technique for handling execution of functions in a function-as-a-service (FaaS) system is provided.

Generally, a FaaS system provides a platform that allows application functionality to be developed, run and managed without the complexity of building and maintaining an infrastructure in order to do so. In a FaaS system, multiple functions may work on the same (externalised) data. For example, in the case of a FaaS system that handles mobile control plane events, one function may be responsible for handling a handover of a user equipment (UE) between two cells, while another function may be responsible for moving the UE to idle mode. Both functions are related to a UE and, as they are executed, they modify and store an overlapping set of data in a database used for storing information indicative of a state of the UE.

The functions in a FaaS system may be attached to a trigger for execution of a function. This trigger referred to herein can be referred to as a "triggering event". Examples of such a trigger referred to herein include, but are not limited to, a hypertext transfer protocol (HTTP) request (such as a GET request or a POST request) to a uniform resource locator (URL) via the HTTP, an incoming message through a messaging system, or a change in a database.

Figures 1, 2:
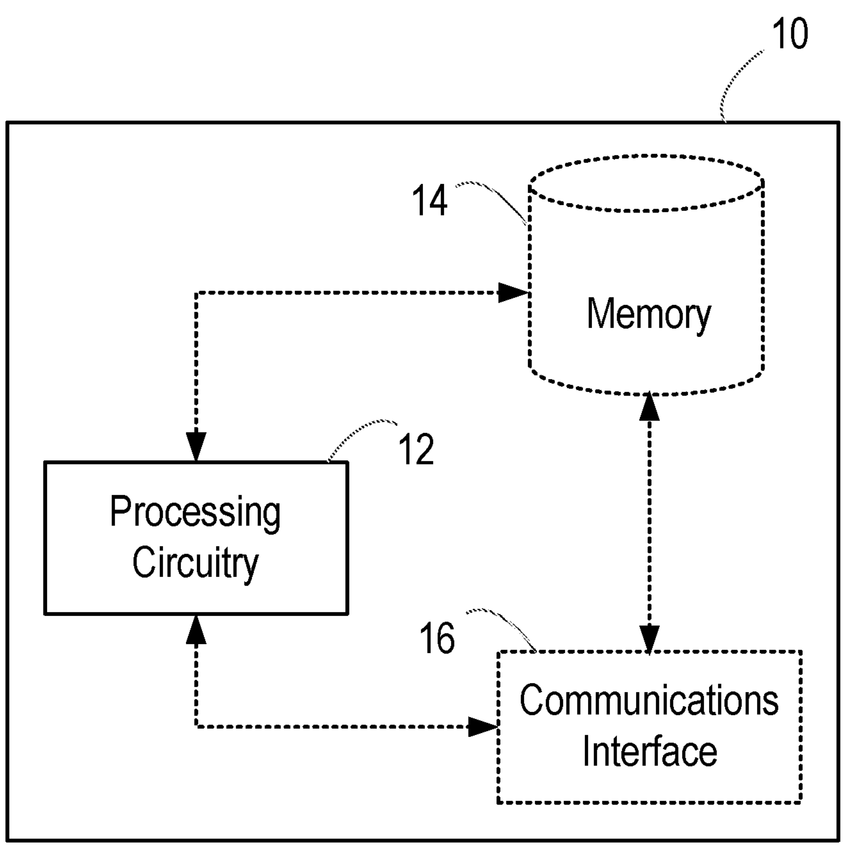
FIG. 1 is a block diagram illustrating an entity according to an embodiment.
FIG. 2 is a flowchart illustrating a method performed by an entity according to an embodiment.

FIG. 1 illustrates an entity 10 in accordance with an embodiment. The entity 10 is for handling execution of functions in a FaaS system. The FaaS system comprises one or more nodes on which functions are executable. The entity 10 referred to herein may, for example, be a physical machine (e.g. a server) or a virtual machine (VM). In some embodiments, the entity 10 referred to herein may be a module, which may also be referred to herein as an "optimizer module". In some embodiments, the entity 10 referred to herein may be an entity of a network, e.g. a fifth generation (5G) network or any other generation network.

As illustrated in FIG. 1, the entity 10 comprises processing circuitry (or logic) 12. The processing circuitry 12 controls the operation of the entity 10 and can implement the method described herein in respect of the entity 10. The processing circuitry 12 can be configured or programmed to control the entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the entity 10. In some embodiments, the processing circuitry 12 can be configured to run software to perform the method described herein in respect of the entity 10. The software may be containerised according to some embodiments. Thus, in some embodiments, the processing circuitry 12 may be configured to run a container to perform the method described herein in respect of the entity 10.

Briefly, the processing circuitry 12 of the entity 10 is configured to group functions into a group of functions to be executed on a single one of the one or more nodes of the FaaS system. The grouping is based on information from the one or more nodes. The information is indicative of which functions access which data during execution of the functions and each function of the group accesses the same data as at least one other function of the group.

As illustrated in FIG. 1, in some embodiments, the entity 10 may optionally comprise a memory 14. The memory 14 of the entity 10 can comprise a volatile memory or a non-volatile memory. In some embodiments, the memory 14 of the entity 10 may comprise a non-transitory media. Examples of the memory 14 of the entity 10 include, but are not limited to, a random-access memory (RAM), a read only memory (ROM), a mass storage media such as a hard disk, a removable storage media such as a compact disk (CD) or a digital video disk (DVD), and/or any other memory.

The processing circuitry 12 of the entity 10 can be connected to the memory 14 of the entity 10. In some embodiments, the memory 14 of the entity 10 may be for storing program code or instructions which, when executed by the processing circuitry 12 of the entity 10, cause the entity 10 to operate in the manner described herein in respect of the entity 10. For example, in some embodiments, the memory 14 of the entity 10 may be configured to store program code or instructions that can be executed by the processing circuitry 12 of the entity 10 to cause the entity 10 to operate in accordance with the method described herein in respect of the entity 10. Alternatively, or in addition, the memory 14 of the entity 10 can be configured to store any information, data, messages, requests, responses, indications, notifications, signals, or similar, that are described herein. The processing circuitry 12 of the entity 10 may be configured to control the memory 14 of the entity 10 to store any information, data, messages, requests, responses, indications, notifications, signals, or similar, that are described herein.

In some embodiments, as illustrated in FIG. 1, the entity 10 may optionally comprise a communications interface 16. The communications interface 16 of the entity 10 can be connected to the processing circuitry 12 of the entity 10 and/or the memory 14 of the entity 10. The communications interface 16 of the entity 10 may be operable to allow the processing circuitry 12 of the entity 10 to communicate with the memory 14 of the entity 10 and/or vice versa. Similarly, the communications interface 16 of the entity 10 may be operable to allow the processing circuitry 12 of the entity 10 to communicate with one or more nodes of the FaaS system, any other nodes and/or any other entities. The communications interface 16 of the entity 10 can be configured to transmit and/or receive any information, data, messages, requests, responses, indications, notifications, signals, or similar, that are described herein. In some embodiments, the processing circuitry 12 of the entity 10 may be configured to control the communications interface 16 of the entity 10 to transmit and/or receive any information, data, messages, requests, responses, indications, notifications, signals, or similar, that are described herein.

Although the entity 10 is illustrated in FIG. 1 as comprising a single memory 14, it will be appreciated that the entity 10 may comprise at least one memory (i.e. a single memory or a plurality of memories) 14 that operate in the manner described herein. Similarly, although the entity 10 is illustrated in FIG. 1 as comprising a single communications interface 16, it will be appreciated that the entity 10 may comprise at least one communications interface (i.e. a single communications interface or a plurality of communications interface) 16 that operate in the manner described herein.

It will also be appreciated that FIG. 1 only shows the components required to illustrate an embodiment of the entity 10 and, in practical implementations, the entity 10 may comprise additional or alternative components to those shown.

FIG. 2 is a flowchart illustrating a method performed by an entity 10 in accordance with an embodiment. The method is for handling execution of functions in a FaaS system. The FaaS system comprises one or more nodes on which functions are executable. The entity 10 described earlier with reference to FIG. 1 is configured to operate in accordance with the method of FIG. 2. The method can be performed by or under the control of the processing circuitry 12 of the entity 10.

As illustrated at block 100 of FIG. 2, functions are grouped into a group of functions to be executed on a single one of the one or more nodes of the FaaS system. More specifically, the processing circuitry 12 of the entity 10 groups the functions into the group of functions. The grouping is based on information from the one or more nodes. The information is indicative of which functions access which data during execution of the functions and each function of the group accesses the same data as at least one other function of the group. Herein, the group may also be referred to as an "affinity group".

In some embodiments, grouping functions into a group of functions may comprise creating the group of functions to be executed on the single one of the one or more nodes. More specifically, in some embodiments, the processing circuitry 12 of the entity 10 can be configured to create the group of functions to be executed on the single one of the one or more nodes. In some embodiments, grouping functions into a group of functions by the entity may comprise assigning at least one function to an existing group of functions to be executed on the single one of the one or more nodes. More specifically, in some embodiments, the processing circuitry 12 of the entity 10 may be configured to assign at least one function to an existing group of functions to be executed on the single one of the one or more nodes.

In some embodiments, if a function from one of at least two existing groups of functions accesses the same data as at least one function from another of the at least two existing groups of functions, grouping functions into a group of functions may comprise merging the at least two existing groups of functions into the group of functions to be executed on the single one of the one or more nodes. More specifically, in some embodiments, the processing circuitry 12 of the entity 10 can be configured to merge the at least two existing groups of functions into the group of functions to be executed on the single one of the one or more nodes. In some embodiments, merging the at least two existing groups of functions may comprise merging the at least two existing groups of functions into the one of the at least two existing groups of functions that comprises the most functions.

Although not illustrated in FIG. 2, in some embodiments, the method performed by the entity 10 may comprise, if a function of the group of functions to be executed on the single one of the one or more nodes is located on another one of the one or more nodes, initiating movement of the function to the single one of the one or more nodes. More specifically, in some embodiments, the processing circuitry 12 of the entity 10 can be configured to initiate movement of the function to the single one of the one or more nodes. Herein, the term "initiate" can mean, for example, cause or establish. Thus, the processing circuitry 12 of the entity 10 can be configured to itself move the function or can be configured to cause another entity (or node) to move the function.

Although also not illustrated in FIG. 2, in some embodiments, the method performed by the entity 10 may comprise, if a timer signals that a predefined time period has elapsed since the grouping and, during the predefined time period, a function of the group of functions to be executed on the single one of the one or more nodes fails to access the same data as at least one other function of the group, removing the function from the group. More specifically, in some embodiments, the processing circuitry 12 of the entity 10 can be configured to remove the function from the group. In some embodiments, the method performed by the entity 10 may comprise, initiating a reset of the timer each time the function of the group accesses the same data as at least one other function of the group. More specifically, in some embodiments, the processing circuitry 12 of the entity 10, can be configured to initiate this reset of the timer.

Although also not illustrated in FIG. 2, in some embodiments, the method performed by the entity 10 may comprise, in response to an update to the information, updating the grouping based on the updated information. More specifically, in some embodiments, the processing circuitry 12 of the entity 10 can be configured to update the grouping based on the updated information. In some embodiments, each function may be grouped into the group of functions with one or more triggers. In some of these embodiments, the function may be executable in response to the one or more triggers. In some embodiments, the data accessed by each function of the group of functions to be executed on the single one of the one or more nodes may be stored on the single one of the one or more nodes.

Although also not illustrated in FIG. 2, in some embodiments, the method performed by the entity 10 may comprise generating information indicative of the group of functions. More specifically, the processing circuitry 12 of the entity 10 can be configured to generate information indicative of the group of functions according to some embodiments. In some embodiments, the information indicative of the group of functions may comprise a graph in which each function of the group of functions to be executed on the single one of the one or more nodes may be connected to data that the function accesses during execution of the function.

In some embodiments, the method performed by the entity 10 may comprise initiating transmission of the information indicative of the group of functions towards the single one of the one or more nodes. More specifically, in some embodiments, the processing circuitry 12 of the entity 10 can be configured to initiate transmission of the information indicative of the group of functions towards the single one of the one or more nodes. For example, the processing circuitry 12 of the entity 10 can be configured to itself transmit the information indicative of the group of functions (e.g. via a communications interface 16 of the entity 10) or can be configured to cause another entity (or node) to transmit the information indicative of the group of functions.

Although not illustrated in FIG. 2, in some embodiments, the method performed by the entity 10 may comprise, if a load generated by execution of at least one function of the group of functions is greater than an available capacity of the single one of the one or more nodes, initiating generation of a replica of the at least one function to be executed on another one of the one or more nodes. More specifically, in some embodiments, the processing circuitry 12 of the entity 10 can be configured to initiate generation of the replica. For example, the processing circuitry 12 of the entity 10 can be configured to itself generate the replica or can be configured to cause another entity (or node) to generate the replica. In some embodiments, each of the at least one function of the group of functions may access the same data during execution. In some embodiments, the data accessed by the at least one function of the group of functions may be stored on the another one of the one or more nodes.

In some embodiments, the method performed by the entity 10 may comprise initiating generation of a replica of each function of the group of functions to be executed on the another one of the one or more nodes. More specifically, the processing circuitry 12 of the entity 10 can be configured to initiate generation of a replica of each function of the group of functions to be executed on the another one of the one or more nodes. For example, the processing circuitry 12 of the entity 10 can be configured to itself generate a replica of each function of the group of functions or can be configured to cause another entity (or node) to generate a replica of each function of the group of functions. In some embodiments, execution of the replica of each function of the group of functions may be in response to a corresponding trigger on the single one of the one or more nodes. In some embodiments, the trigger may provide a token. In some of these embodiments, the token may be associated with data to be accessed by the at least one function during execution of the at least one function and/or one of the one or more nodes on which the function is to be executed.

In some embodiments, the information indicative of which functions access which data during execution of the functions may exclude data that is accessed by a predefined number of functions (e.g. a large number of functions, a majority of functions, or all functions) in the FaaS system.

Figures 3, 4:
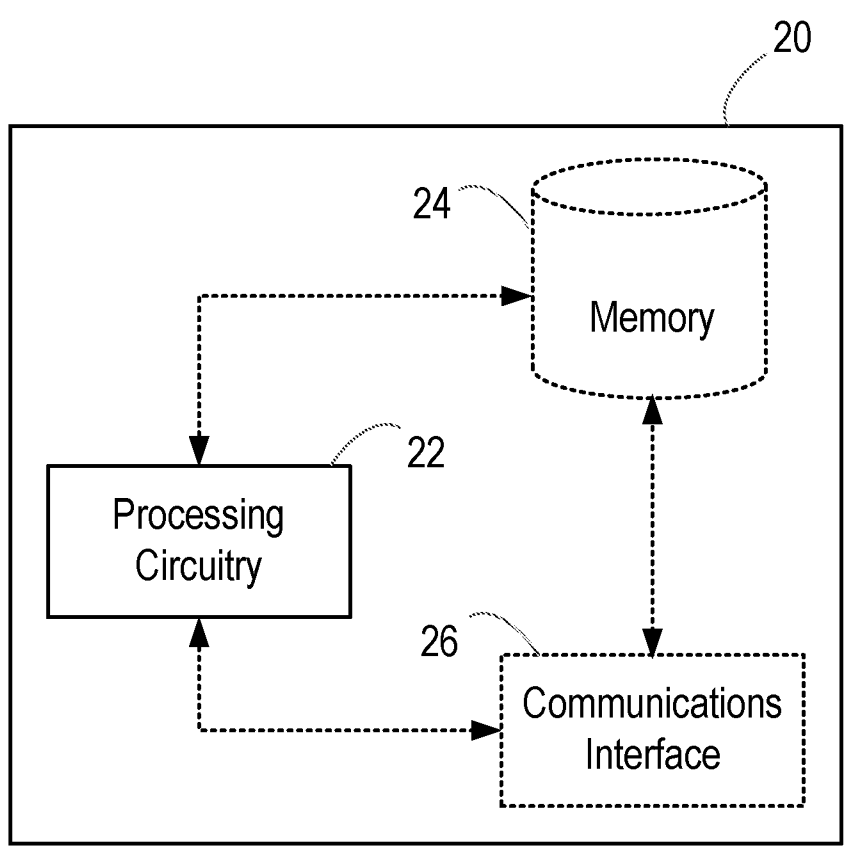
FIG. 3 is a block diagram illustrating a node according to an embodiment.
FIG. 4 is a flowchart illustrating a method performed by a node according to an embodiment.

FIG. 3 illustrates a node 20 of one or more nodes of a FaaS system in accordance with an embodiment. The node 20 is for assisting an entity with handling execution of functions on the one or more nodes of the FaaS system. The node 20 may, for example, be a physical machine (e.g. a server) or a virtual machine (VM). In some embodiments, the node 20 may be a node of a network, e.g. a fifth generation (5G) network or any other generation network.

As illustrated in FIG. 3, the node 20 comprises processing circuitry (or logic) 22. The processing circuitry 22 controls the operation of the node 20 and can implement the method described herein in respect of the node 20. The processing circuitry 22 can be configured or programmed to control the node 20 in the manner described herein. The processing circuitry 22 can comprise one or more hardware components, such as one or more processors, one or more processing units, one or more multi-core processors, and/or one or more modules. In particular implementations, each of the one or more hardware components can be configured to perform, or is for performing, individual or multiple steps of the method described herein in respect of the node 20. In some embodiments, the processing circuitry 22 can be configured to run software to perform the method described herein in respect of the node 20. The software may be containerised according to some embodiments. Thus, in some embodiments, the processing circuitry 22 may be configured to run a container to perform the method described herein in respect of the node 20.

Briefly, the processing circuitry 22 of the node 20 is configured to generate information indicative of which functions access which data during execution of the functions on the node. The generated information is for use by an entity 10 to group functions into a group of functions to be executed on a single one of the one or more nodes. Each function of the group accesses the same data as at least one other function of the group.

As illustrated in FIG. 3, in some embodiments, the node 20 may optionally comprise a memory 24. The memory 24 of the node 20 can comprise a volatile memory or a non-volatile memory. In some embodiments, the memory 24 of the node 20 may comprise a non-transitory media. Examples of the memory 24 of the node 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the node 20 can be connected to the memory 24 of the node 20. In some embodiments, the memory 24 of the node 20 may be for storing program code or instructions which, when executed by the processing circuitry 22 of the node 20, cause the node 20 to operate in the manner described herein in respect of the node 20. For example, in some embodiments, the memory 24 of the node 20 may be configured to store program code or instructions that can be executed by the processing circuitry 22 of the node 20 to cause the node 20 to operate in accordance with the method described herein in respect of the node 20. Alternatively or in addition, the memory 24 of the node 20 can be configured to store any information, data, messages, requests, responses, indications, notifications, signals, or similar, that are described herein. The processing circuitry 22 of the node 20 may be configured to control the memory 24 of the node 20 to store information, data, messages, requests, responses, indications, notifications, signals, or similar, that are described herein.

In some embodiments, as illustrated in FIG. 3, the node 20 may optionally comprise a communications interface 26. The communications interface 26 of the node 20 can be connected to the processing circuitry 22 of the node 20 and/or the memory 24 of the node 20. The communications interface 26 of the node 20 may be operable to allow the processing circuitry 22 of the node 20 to communicate with the memory 24 of the node 20 and/or vice versa. Similarly, the communications interface 26 of the node 20 may be operable to allow the processing circuitry 22 of the node 20 to communicate with the entity 10 described herein, any other entity and/or any other node. The communications interface 26 of the node 20 can be configured to transmit and/or receive information, data, messages, requests, responses, indications, notifications, signals, or similar, that are described herein. In some embodiments, the processing circuitry 22 of the node 20 may be configured to control the communications interface 26 of the node 20 to transmit and/or receive information, data, messages, requests, responses, indications, notifications, signals, or similar, that are described herein.

Although the node 20 is illustrated in FIG. 3 as comprising a single memory 24, it will be appreciated that the node 20 may comprise at least one memory (i.e. a single memory or a plurality of memories) 24 that operate in the manner described herein. Similarly, although the node 20 is illustrated in FIG. 3 as comprising a single communications interface 26, it will be appreciated that the node 20 may comprise at least one communications interface (i.e. a single communications interface or a plurality of communications interface) 26 that operate in the manner described herein. It will also be appreciated that FIG. 3 only shows the components required to illustrate an embodiment of the node 20 and, in practical implementations, the node 20 may comprise additional or alternative components to those shown.

FIG. 4 is a flowchart illustrating a method performed by a node 20 of one or more nodes of a FaaS system in accordance with an embodiment. The method is to assist an entity with handling execution of functions on the one or more nodes of the FaaS system. The node 20 described earlier with reference to FIG. 3 is configured to operate in accordance with the method of FIG. 4. The method can be performed by or under the control of the processing circuitry 22 of the node 20

As illustrated at block 200 of FIG. 4, information indicative of which functions access which data during execution of the functions is generated. More specifically, the processing circuitry 22 of the node 20 generates the information indicative of which functions access which data during execution of the functions. The generated information is for use by an entity 10 to group functions into a group of functions to be executed on a single one of the one or more nodes. Each function of the group accesses the same data as at least one other function of the group.

Although not illustrated in FIG. 4, in some embodiments, the method performed by the node 20 may comprise initiating transmission of the generated information to the entity 10. More specifically, in some embodiments, the processing circuitry 22 of the node 20 can be configured to initiate transmission of the generated information to the entity 10. For example, the processing circuitry 12 of the node 20 can be configured to itself transmit the generated information (e.g. via a communications interface 26 of the node 20) or can be configured to cause another node (or entity) to transmit the generated information.

Although also not illustrated in FIG. 4, in some embodiments, the method performed by the node 20 may comprise acquiring, from the entity 10, information indicative of the group of functions. More specifically, in some embodiments, the processing circuitry 22 of the node 20 can be configured to acquire, from the entity 10, information indicative of the group of functions. For example, in some embodiments, the processing circuitry 22 of the node 20 can be configured to remotely access the information indicative of the group of functions from the entity 10 or receive the information indicative of the group of functions from the entity 10 (e.g. via a communications interface 26 of the node 20). In some embodiments, the information indicative of the group of functions may comprise a graph in which each function of the group of functions to be executed on the single one of the one or more nodes may be connected to data that the function accesses during execution of the function.

In some embodiments, the node 20 may be the single one of the one or more nodes referred to herein. In some of these embodiments, although not illustrated in FIG. 4, the method performed by the node 20 may comprise executing at least one function of the group of functions. More specifically, the processing circuitry 22 of the node 20 can be configured to execute at least one function of the group of functions according to some embodiments. In some embodiments, the execution of each of the at least one function of the group of functions may be in response to a trigger.

Although not illustrated in FIG. 4, in some embodiments, the method performed by the node 20 may comprise, if a load generated by execution of at least one function of the group of functions is greater than an available capacity of the node 20, generating a replica of the at least one function to be executed on another one of the one or more nodes. More specifically, the processing circuitry 22 of the node 20 can be configured to generate the replica of the at least one function to be executed on another one of the one or more nodes according to some embodiments. In some embodiments, each of the at least one function of the group of functions may access the same data during execution. In some embodiments, the data accessed by the at least one function of the group of functions may be stored on the another one of the one or more nodes.

In some embodiments, although not illustrated in FIG. 4, the method performed by the node 20 may comprise generating a replica of each function of the group of functions to be executed on the another one of the one or more nodes. More specifically, the processing circuitry 22 of the node 20 can be configured to generate the replica of each function of the group of functions to be executed on the another one of the one or more nodes according to some embodiments. In some embodiments, execution of the replica of each function of the group of functions is in response to a corresponding trigger on the node 20. In some of these embodiments, the trigger may provide a token. In some embodiments, the token may be associated with data to be accessed by the at least one function during execution of the at least one function and/or one of the one or more nodes on which the function is to be executed.

There is also provided a FaaS system. The FaaS system is for handling and/or assisting with handling execution of functions in the FaaS system. The FaaS system can comprise at least one entity 10 as described herein and/or at least one node 20 as described herein. A method performed by the FaaS system can thus comprise the method described herein in respect of the entity 10 and/or the method described herein in respect of the node 20.

Figure 5:
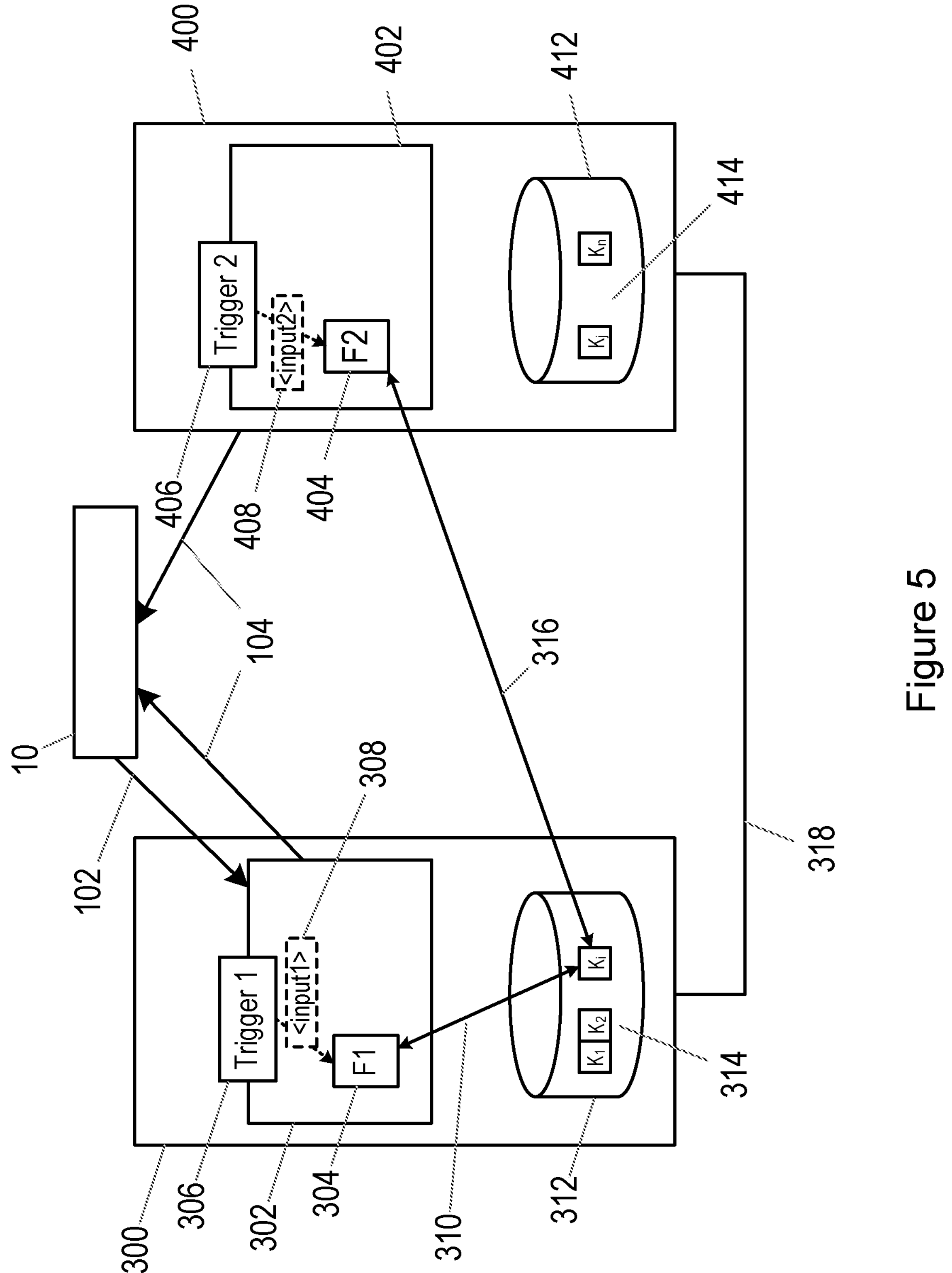
FIG. 5 is a block diagram illustrating an example function-as-a-service system.

FIG. 5 is a block diagram illustrating an example FaaS system. In the example illustrated in FIG. 5, the FaaS system comprises the entity 10 as described earlier and the one or more nodes 300, 400 mentioned earlier. More specifically, in the example illustrated in FIG. 5, the FaaS system comprises a first node 300 and a second node 400. Although the example FaaS system illustrated in FIG. 5 comprises two nodes, it will be understood that the FaaS system referred to herein may comprise any other number of nodes. The entity 10 of the FaaS system illustrated in FIG. 5 may be configured to operate as described earlier in respect of the entity 10 with reference to FIGS. 1 and 2. The first node 300 and/or the second node 400 may be configured to operate as described earlier in respect of the node 20 with reference to FIGS. 3 and 4. As illustrated by the line 318 in FIG. 5, the first node 300 and second node 400 can communicate, e.g. over a network.

The first node 300 is running a first runtime instance 302. The second node 400 is running a second runtime instance 402. Thus, one or more (e.g. each) node 300, 400 of the FaaS system may host a runtime instance 302, 402 according to some embodiments. A runtime instance 302, 402 can be responsible for executing functions. The FaaS system can execute any function on any of the runtime instances. The first node 300 comprises a first database (or datastore) 312 that is configured to store data 314. The second node 400 comprises a second database (or datastore) 412 that is also configured to store data 414. At the first database 312, the stored data 314 can comprise a plurality of data elements, e.g. a plurality of keys $K_1$, $K_2$, $K_i$. Similarly, at the second database 412, the stored data 414 can comprise a plurality of data elements, e.g. a plurality of keys $K_j$, $K_n$.

The first database 312 and/or the second database 412 can have multiple instances. Thus, one or more (e.g. each) node 300, 400 of the FaaS system may host a database instance according to some embodiments. The instances of the database 312, 412 can enable the functions 304, 404 to store their data and ensure that the functions 304, 404 can run in a stateless manner. In some embodiments where the stored data 314, 414 comprises a plurality of data elements, one or more (e.g. each) of the plurality of data elements may be identified by a unique key across all database instances. In each node 300, 400, the runtime instance 302, 402 and the instances of the database 312, 412 can form their own, separate clusters. In the case of the database 312, 412, the stored data can be distributed between the instances participating in the cluster. The FaaS system may relocate data elements across the instances of the database 312, 412.

In the example illustrated in FIG. 5, a first function (F1) 304 is attached to a first trigger (Trigger 1) 306 and a second function (F2) 404 is attached to a second trigger (Trigger 2) 406. In some embodiments where functions are attached to triggers, the FaaS system may be an event driven system. A function attached to a trigger makes a trigger-function pair. This trigger-function pair may be referred to herein as an attachment. The first trigger 306 and the second trigger 406 may be different.

In some embodiments, a trigger referred to herein (e.g. the first trigger and/or the second trigger referred to herein) may comprise, for example, a hypertext transfer protocol (HTTP) request, a message queue, a database key, a timer, or any other trigger. When a trigger fires, the function attached to the trigger is executed. In some embodiments, the function attached to the trigger may be executed with a given input. During execution of the function, the function may access data, e.g. one or more of the plurality of data elements (e.g. keys). In some embodiments involving an input, the data to be accessed may be derived from the input. In other embodiments, the data to be accessed may be hard coded. The FaaS system may not be aware of the data that is to be accessed by a function before execution of the function (e.g. the FaaS system may only track the accessed data after the function has been executed).

In some embodiments, the same function (code) can be attached to multiple triggers and/or may serve different tasks. From an identification point of view (e.g. when identifying a relation with accessed data), it may be that an attachment is relevant. Thus, it will be understood that the method described herein in respect of a function may instead be performed in respect of an attachment (i.e. a function and its corresponding trigger(s)) according to some embodiments.

FIG. 5 shows a single execution of both the first function 304 and the second function 404. The first function 304 has a first input (e.g. value) 308 and the second function 404 has a second input (e.g. value) 408. The first input 308 and the second input 408 may be different. The first function 304 and the second function 404 may use overlapping data, e.g. an overlapping set of data elements. In the example illustrated in FIG. 5, the first function 304 and the second function 404 both use data element $K_i$. In the example illustrated in FIG. 5, the data element $K_i$ is stored on the first node 300. As the attachment of the first function 304 and the second function 404 is performed independently, without further hints, the FaaS system of FIG. 5 may allocate the first function 304 and the second function 404 to different nodes 300, 400 (or, more specifically, runtime instances 302, 402 of different nodes 300, 400) for execution.

As illustrated by the arrow 310 in FIG. 5, the first function 304 can locally access data 314 from the first database 312 of the first node 300. However, as illustrated by arrow 316 in FIG. 5, this requires the second function 404 to remotely access data 314 from the first database 312 of the first node 300 and remote data access has a significant performance impact on the execution of the second function 404 (e.g. remote data access can be approximately 5-20 times slower than local data access depending on the networking hardware). This is the case even if the first database 312 of the first node 300 can physically move data element $K_i$ between its database instances and thus there is no optimum location for the first database 312 of the first node 300 to resolve this issue. In large scale cloud deployments, the relative performance impact on the execution of the second function can be even higher. As a result, a function attempting to access even a single data element located on a different node to that on which the function is executed may spend more time waiting for the database to respond than the time it takes for the function to actually execute.

Thus, in order to optimise performance (e.g. lower function execution latency and/or reach higher throughput) and/or to lower resource usage, the entity 10 described herein groups the first and second functions 304, 404 into a group of functions to be executed on a single one of the nodes 300, 400 of the FaaS system in the manner described earlier. The grouping is based on information from the nodes 300, 400 of the FaaS system. As described earlier, the information is indicative of which functions 304, 404 access which data 314, 414 during execution of the functions 304, 404 and each function 304 of the group accesses the same data 314 as at least one other function 404 of the group. As the information is indicative of which functions 304, 404 access which data 314, 414 during execution of the functions 304, 404, the entity 10 (or, more specifically, the processing circuitry 12 of the entity 10) can identify which functions 304, 404 use the same data 314 during their executions (e.g. at the moment) and thus create the group of functions comprising one or more functions that access at least some of the same data.

The information indicative of which functions 304, 404 access which data 314, 414 during execution of the functions 304, 404 can be made available to the entity 10 in any suitable way. As illustrated by the arrows 104 of FIG. 5, in some embodiments, the entity 10 may receive the information from the nodes 300, 400 of the FaaS system. Thus, the nodes 300, 400 of the FaaS system may send (or transmit) the information to the entity 10 according to some embodiments. However, it will be understood that, in other embodiments, the entity 10 may remotely access the information at the nodes 300, 400 of the FaaS system. In some embodiments, an execution report may comprise the information indicative of which functions 304, 404 access which data 314, 414 during execution of the functions 304, 404. The execution report may, for example, be generated after each execution of the functions 304, 404. In some embodiments, the execution report may also comprise an execution time for the functions 304, 404, resources used for the execution of the functions and/or statistics on the access of the functions 304, 404.

As described earlier and as illustrated by arrow 102 of FIG. 5, in some embodiments, the entity 10 (or, more specifically, the processing circuitry 12 of the entity 10) may initiate transmission of (e.g. itself transmit, such as via a communications interface 16 of the entity 10, or cause another entity to transmit) the information indicative of the group of functions towards the single one 300 of the one or more nodes 300, 400 e.g. towards the runtime instance 302 of the single one 300 of the one or more nodes 300, 400. This information can be indicative of the configuration of the group of functions according to some embodiments. As described earlier, the single one 300 of the one or more nodes 300, 400 may execute at least one function 304, 404 of the group of functions. Thus, the functions 304, 404 in the same group are executed on the same node 300.

In some embodiments, as mentioned earlier, the information indicative of the group of functions may comprise a graph in which each function 304, 404 of the group of functions to be executed on the single one 300 of the one or more nodes 300, 400 is connected to data 314 that the function accesses during execution of the function. For example, the entity 10 (or, more specifically, the processing circuitry 12 of the entity 10) may maintain a bipartite graph where the vertices of the graph represent the functions 304, 404 (or function-trigger pairs) and the data 314, 414 (e.g. a plurality of data elements, such as a plurality of keys), and the edges of the graph represent the data accesses. The graph can be (e.g. continuously or periodically) updated by the entity 10 (or, more specifically, the processing circuitry 12 of the entity 10). For example, the graph may be updated based on the information indicative of which functions 304, 404 access which data 314, 414 during execution of the functions 304, 404. Thus, the number and/or structure of groups may be updated according to some embodiments in order to maintain an up-to-date view of the association between functions and data, since the functions may change the data that they access over time.

In some embodiments, the entity 10 (or, more specifically, the processing circuitry 12 of the entity 10) may use a connected component concept to represent the functions 304, 404 that access (e.g. are currently working on) the same data 314. In graph theory, a connected component (CC) in an undirected graph is where there exists a path between any two vertices in the graph. In this context, each connected component in the graph can comprise the functions 304, 404 that access (e.g. are currently working on) the same data 314 and that are thus assigned to the same group of functions. In some embodiments, one or more keys used to access the data 314 may also be assigned to the group.

As mentioned earlier, one or more nodes of the FaaS system can provide information indicative of which functions 304, 404 access which data 314, 414 to the entity 10, while the entity 10 can provide information indicative of the group of functions to (e.g. the runtime instance 302 of) the single one 300 of the one or more nodes 300, 400. In some embodiments, information such as this may be provided in a batch for optimisation purposes. For example, information may be provided in a single message according to some embodiments. In some embodiments, the entity 10 (or, more specifically, the processing circuitry 12 of the entity 10) may store, e.g. in a memory such as a memory of the entity 10 and/or any other memory, the information indicative of the group of functions. In an embodiment where the information indicative of the group of functions comprises a graph, this storage may be implemented in a distributed fashion, e.g. by using a distributed graph database to store the graph.

As mentioned earlier, the data 314 accessed by a function 304, 404 may change over time, which means the number and structure (i.e. constituent functions) of groups of functions may also change. Thus, in some embodiments, a timer may be set to signal that a predefined time period has elapsed since the grouping for a potential update to the grouping to be implemented. For example, in some embodiments, if the timer signals that a predefined time period has elapsed since the grouping and, during the predefined time period, a function of the group of functions to be executed on the single one 300 of the one or more nodes 300, 400 fails to access the same data 314 as at least one other function of the group, the function may be removed from the group. In the graph example, the timer may be set to define a time to live (TTL). For example, each edge in the graph may have a predefined TTL. The TTL can be indicative of a lifetime for the edge and can be used to remove the edge when it is not valid anymore. For example, when the TTL of an edge expires, the edge may no longer be valid and may thus be removed from the graph. The timer referred to herein can be defined by a user or may be learned (or tuned) through use of machine learning.

In the example illustrated in FIG. 5, the first function 304 and the second function 404 are located on different nodes 300, 400. As described earlier, in some embodiments, if a function of the group of functions 304, 404 to be executed on the single one of the one or more nodes 300, 400 is located on another one of the one or more nodes 300, 400, the entity 10 (or, more specifically, the processing circuitry 12 of the entity 10) may initiate movement of the function (and optionally also the trigger to which the function is attached) to the single one of the one or more nodes 300, 400. Thus, in the example FaaS system illustrated in FIG. 5, the entity 10 (or, more specifically, the processing circuitry 12 of the entity 10) may initiate movement of the second function 404 (and optionally also the second trigger 406 to which the second function 404 is attached) to the first node 300 according to some embodiments, where the first node 300 is the single one of the one or more nodes 300, 400 on which the group of functions 304, 404 is to be executed.

In this case, the data 314 accessed by each function 304, 404, of the group of functions to be executed on the single one 300 of the one or more nodes 300, 400 is stored on the single one 300 of the one or more nodes 300, 400. Thus, in some embodiments, the function execution can be co-located with the data storage. In this way, performance can be further optimised (e.g. function execution latency can be further lowered and/or even higher throughput can be reached) and/or resource usage can be further lowered.

In some embodiments, the data 314 accessed by the functions 304, 404 of the group of functions may be co-located with the functions either automatically by the database 312 (e.g. based on data access patterns) or via direct configuration (e.g. through an interface between the database 312 and the runtime instance 302 of the node 300).

In some embodiments, functions which access the same data may be (e.g. dynamically) identified before the functions are (e.g. dynamically) co-located with specific data. A dynamic identification of which functions access which data can be particularly useful in some use-cases (e.g. robotics), e.g. those in which the functions change the data that they access over time. In other embodiments, in the example FaaS system illustrated in FIG. 5, the entity 10 (or, more specifically, the processing circuitry 12 of the entity 10) may initiate movement of the first function 304 to the second node 400, where the second node 400 is the single one of the one or more nodes 300, 400 on which the group of functions 304, 404 is to be executed.

Figure 6:
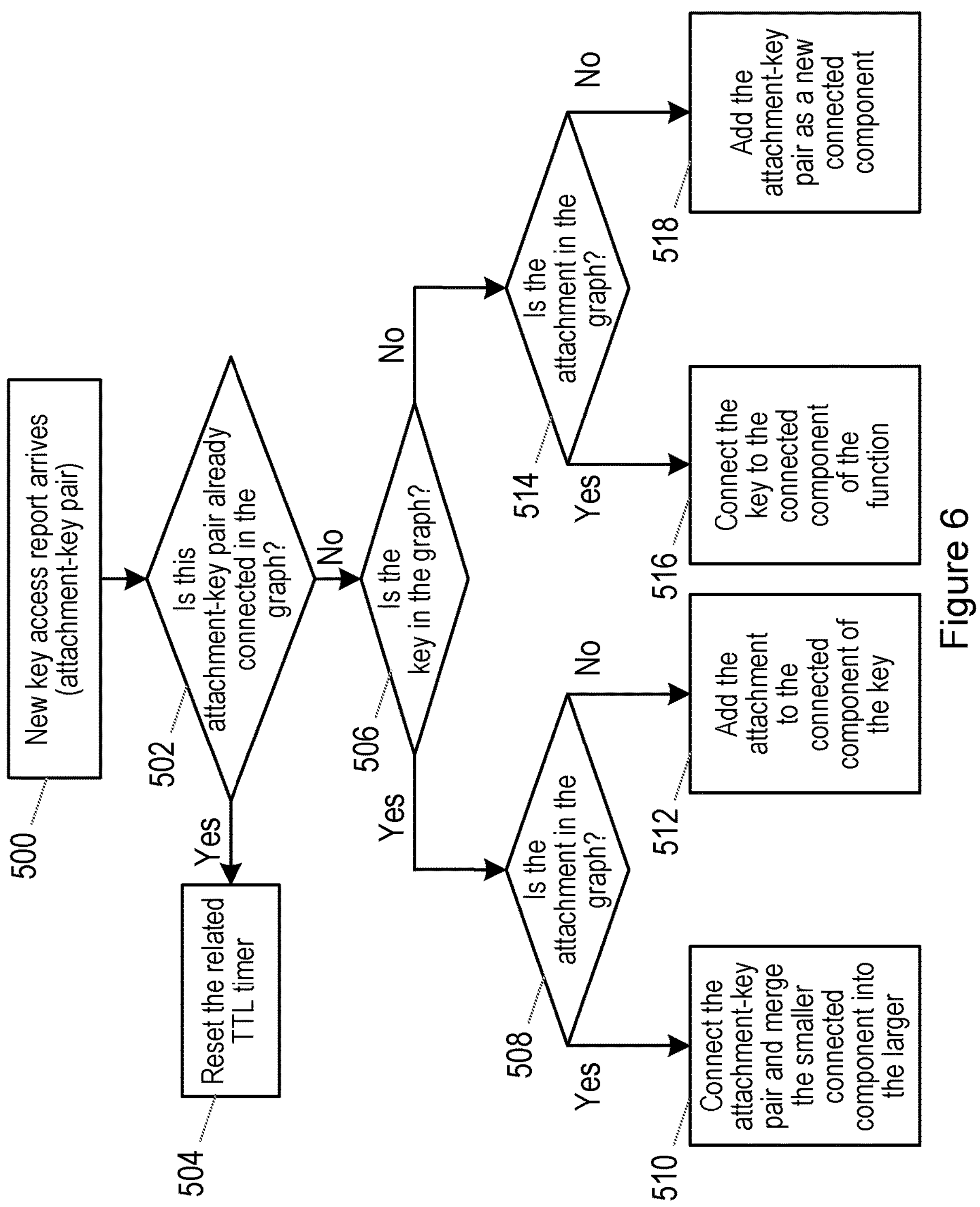
FIG. 6 is a flowchart illustrating a method performed by an entity according to an embodiment.

FIG. 6 is a flowchart illustrating a method performed by an entity 10 in accordance with an embodiment. In more detail, FIG. 6 illustrates the manner in which a graph can be used to group attachments (functions and their corresponding triggers) and keys into groups. Although the embodiment illustrated in FIG. 6 is described in respect of grouping attachments and keys, it will be understood that the description in respect of FIG. 6 can apply to grouping functions and data respectively. The entity 10 described earlier with reference to FIG. 1 can be configured to operate in accordance with the method of FIG. 6. The method can be performed by or under the control of the processing circuitry 12 of the entity 10.

At block 500 of FIG. 6, the entity 10 (or, more specifically, the processing circuitry 12 of the entity 10, e.g. via a communications interface 16 of the entity 10) acquires information from one or more nodes of the FaaS system. The information is indicative of which functions access which data during execution of the functions. More specifically, in the embodiment illustrated in FIG. 6, the information is indicative of an attachment and a corresponding key, i.e. an attachment-key pair and an execution report comprises the information. The entity 10 (or, more specifically, the processing circuitry 12 of the entity 10) can process the attachment-key pair from the execution report.

In more detail, at block 502 of FIG. 6, the entity 10 (or, more specifically, the processing circuitry 12 of the entity 10) identifies whether the attachment is already connected to the key in a graph. If it is identified at block 502 of FIG. 6 that the attachment is already connected to the key in a graph, the method proceeds to block 504 of FIG. 6. At block 504 of FIG. 6, a timer (which can define a TTL) related to the attachment-key pair is reset by the entity 10 (or, more specifically, the processing circuitry 12 of the entity 10). For example, the timer may be reset each time the attachment accesses the key. On the other hand, if it is identified at block 502 of FIG. 6 that the attachment is not already connected to the key in the graph, the method proceeds to block 506 of FIG. 6. For example, if the execution report comprises an attachment-key pair that is not already in the graph, the structure can be updated accordingly. At block 506 of FIG. 6, the entity 10 (or, more specifically, the processing circuitry 12 of the entity 10) identifies whether the key is in the graph. If it is identified at block 506 of FIG. 6 that the key is in the graph, the method proceeds to block 508 of FIG. 6. On the other hand, if it is identified at block 506 of FIG. 6 that the key is not in the graph, the method proceeds to block 514 of FIG. 6.

At block 508 of FIG. 6, the entity 10 (or, more specifically, the processing circuitry 12 of the entity 10) identifies whether the attachment is present in the graph. If it is identified at block 508 of FIG. 6 that the attachment is in the graph, the method proceeds to block 510 of FIG. 6. At block 510 of FIG. 6, the entity 10 (or, more specifically, the processing circuitry 12 of the entity 10) connects the attachment-key pair. Thus, if both the key and the attachment are in the graph but are not connected in the graph, the entity 10 (or, more specifically, the processing circuitry 12 of the entity 10) connects them. The key and the attachment may be connected by adding an edge to the graph to connect them. This means that the two connected components are merged, which also means that two groups of functions may be merged into one.

As described earlier, in some embodiments, if a function from one of at least two existing groups of functions accesses the same data as at least one function from another of the at least two existing groups of functions, grouping functions can comprise merging the at least two existing groups of functions into the group of functions to be executed on the single one of the one or more nodes. In some embodiments, the at least two existing groups of functions may be merged into the one of the at least two existing groups of functions that comprises the most functions. Thus, in the embodiment illustrated in FIG. 6, the smaller connected component can be merged into the larger connected component. In this way, the number of attachments that must be reconfigured can be minimised (i.e. reconfiguration overhead can be minimised) and optimisation can be provided.

On the other hand, if it is identified at block 508 of FIG. 6 that the attachment is not in the graph, the method proceeds to block 512 of FIG. 6. At block 512 of FIG. 6, the entity 10 (or, more specifically, the processing circuitry 12 of the entity 10) adds the attachment to the graph. More specifically, the attachment may be added to the connected component of the key in the graph. Thus, the attachment may be placed in a group comprising functions which are connected to the key of the attachment-key pair.

At block 514 of FIG. 6, the entity 10 (or, more specifically, the processing circuitry 12 of the entity 10) identifies whether the attachment is in the graph. If it is identified at block 514 of FIG. 6 that the attachment is in the graph, the method proceeds to block 516 of FIG. 6. At block 516 of FIG. 6, the entity 10 (or, more specifically, the processing circuitry 12 of the entity 10) connects the key to the connected component of the function that the attachment comprises. Thus, the key may be placed in a group comprising the function that the attachment of the attachment-key pair comprises. If either the key or the attachment is in the graph, a new vertex may be added to that existing connected component.

On the other hand, if it is identified at block 514 of FIG. 6 that the attachment is not in the graph, the method proceeds to block 518 of FIG. 6. At block 518 of FIG. 6, the entity 10 (or, more specifically, the processing circuitry 12 of the entity 10) adds the attachment-key pair to the graph as a new connected component. Thus, if neither the key nor the attachment are in the graph a new connected component is created. In this way, a new group can be created comprising the attachment-key pair. In some embodiments in which a new group is created, the entity 10 (or, more specifically, the processing circuitry 12 of the entity 10) may assign a unique identifier to the group. This unique identifier may be used for the whole lifetime of the group. It can, for example, be used during communication with a runtime instance.

Figure 7:
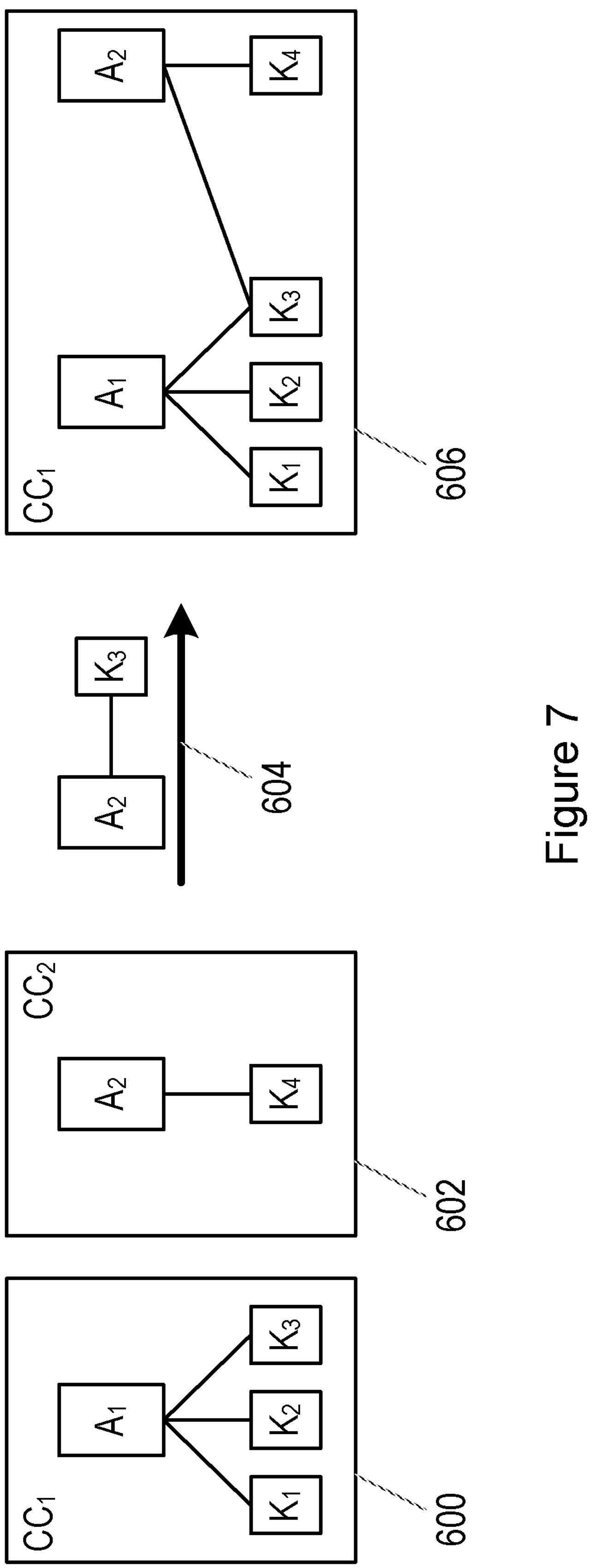
FIG. 7 is a block diagram illustrating a grouping according to an embodiment.

FIG. 7 is a block diagram illustrating a grouping in accordance with an embodiment. As mentioned earlier, in some embodiments, grouping functions can comprise merging at least two existing groups of functions into a group of functions to be executed on a single one of one or more nodes of a FaaS system. FIG. 7 illustrates the merging of two groups of functions into a single group of functions. More specifically, FIG. 7 illustrates the merging of two groups 600, 602 of connected components into a single group 606 of connected components. The first group 600 of connected components ($CC_1$) and the second group 602 of connected components ($CC_2$) can each be referred to as a subgraph. The single group 606 of connected components can be referred to as a graph.

In the embodiment illustrated in FIG. 7, a first group 600 of connected components ($CC_1$) comprises a first attachment ($A_1$) connected to a first set of one or more keys ($K_1$, $K_2$, $K_3$) and a second group 602 of connected components ($CC_2$) comprises a second attachment ($A_2$) connected to a second set of one or more keys ($K_4$). The first and second attachments $A_1$, $A_2$ each comprise one or more functions and the keys $K_1$, $K_2$, $K_3$, $K_4$ are examples of the data that may be accessed by the one or more functions.

As described earlier, the grouping of functions into a group of functions to be executed on a single one of the one or more nodes is based on information from the one or more nodes of the FaaS system. This information is indicative of which functions access which data during execution of the functions. As illustrated by arrow 604 of FIG. 7, in this embodiment, the information from the one or more nodes of the FaaS system is indicative that at least one function of the second connected component $A_2$ accesses the key $K_3$. As illustrated in FIG. 7, this key $K_3$ is also accessed by at least one function of the first component Ai. Thus, the entity 10 (or, more specifically, the processing circuitry 12 of the entity 10) merges the first group 600 of connected components ($CC_1$) and the second group 602 of connected components ($CC_2$) into the single group 606 of connected components. More specifically, in the embodiment illustrated in FIG. 7, the second group 602 of connected components ($CC_2$) is merged into the first group 600 of connected components ($CC_2$) as the first group 600 of connected components ($CC_1$) is larger than the second group 602 of connected components ($CC_2$).

As described earlier, each function of the resulting group 606 accesses the same data as at least one other function of the group 606. More specifically, in the embodiment illustrated in FIG. 7, at least one function of the first attachment $A_1$ of the group 606 accesses the same key $K_3$ as at least one function of the second attachment $A_2$ of the group 606. The resulting group 606 thus comprises attachments $A_1$, $A_2$ that comprise functions that access the same data $K_3$. In some embodiments, the entity 10 (or, more specifically, the processing circuitry 12 of the entity 10) may initiate transmission of information indicative of the resulting group 606 towards (e.g. the runtime of) the single one of the one or more nodes. That is, the entity 10 (or, more specifically, the processing circuitry 12 of the entity 10, e.g. via a communications interface 16 of the entity 10) can propagate the update to the group structure towards (e.g. the runtime of) the single one of the one or more nodes.

As described earlier, in some embodiments, if a function of the group of functions to be executed on the single one of the one or more nodes is located on another one of the one or more nodes, the entity 10 (or, more specifically, the processing circuitry 12 of the entity 10) may initiate movement of the function to the single one of the one or more nodes. Thus, in the embodiment illustrated in FIG. 7, the entity 10 (or, more specifically, the processing circuitry 12 of the entity 10) may, for example, initiate movement of execution of the second attachment $A_2$ of the group 606 to the single one of the one or more nodes on which the first attachment $A_1$ is located. In this way, the system can locate the executions of both attachments ($A_1$ and $A_2$) on the same node of the system.

Figure 8:
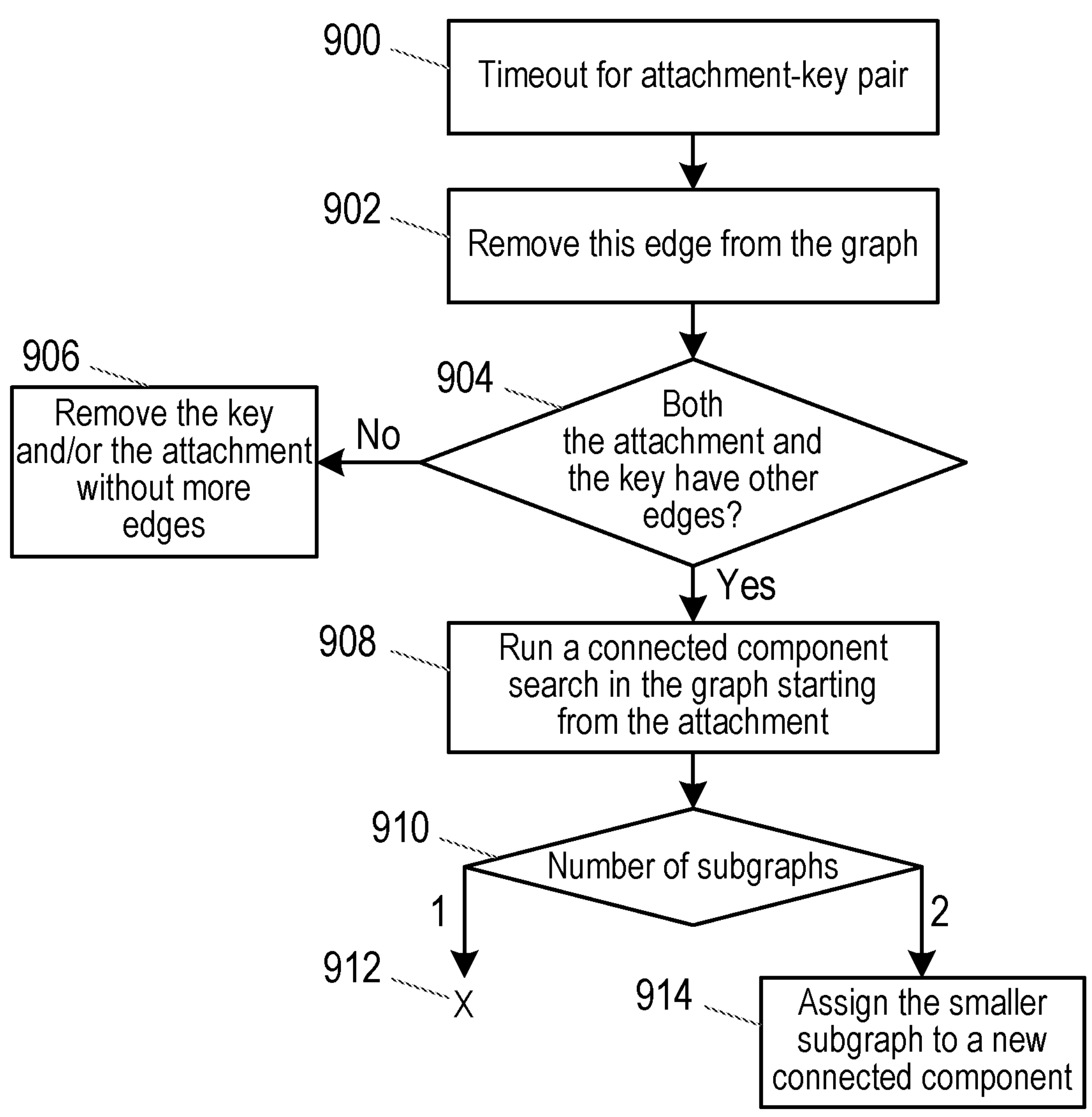
FIG. 8 is a flowchart illustrating a method performed by an entity according to an embodiment.

FIG. 8 is a flowchart illustrating a method performed by an entity 10 in accordance with an embodiment. Although the embodiment illustrated in FIG. 8 is described in respect of attachments and keys, it will be understood that the description in respect of FIG. 8 can apply to functions and data respectively. The entity 10 described earlier with reference to FIG. 1 can be configured to operate in accordance with the method of FIG. 8. The method can be performed by or under the control of the processing circuitry 12 of the entity 10.

As described earlier, in some embodiments, if a timer signals that a predefined time period has elapsed since grouping functions and, during the predefined time period, a function of a group of functions to be executed on the single one of the one or more nodes fails to access the same data as at least one other function of the group, the function may be removed from the group. FIG. 8 illustrates the manner in which the entity 10 may handle such a timer according to an embodiment.

In some embodiments, the timer can be associated with a graph in which each function of the group of functions to be executed on the single one of the one or more nodes is connected to data that the function accesses during execution of the function. More specifically, in some embodiments, the timer may be associated with the edges of a graph, such as the graph 606 illustrated in FIG. 7, where each edge of the graph represents a connection between a key and an attachment that accesses the key. That is, each edge of the graph represents an attachment-key pair. The attachment and the key are vertices in the graph. In these embodiments, the timer can be used to take apart groups according to some embodiments. In this way, dynamic co-location of functions and data is made possible. In more detail, FIG. 8 illustrates the manner in which the entity 10 may handle expiration of a time to live (TTL) using a timer.

At block 900 of FIG. 8, the timer associated with an edge of the graph expires. That is, there is a timeout (or a TTL expires for) a connection between an attachment and a key (i.e. an attachment-key pair) in a first group. In response, at block 902 of FIG. 8, the entity 10 (or, more specifically, the processing circuitry 12 of the entity 10) removes the edge from the graph. That is, the connection between the attachment and the key is removed from the graph.

In some embodiments, the entity 10 (or, more specifically, the processing circuitry 12 of the entity 10) may be configured to identify whether this removal results in two disjoint subgraphs and thus two separate groups. Thus, at block 904 of FIG. 8, it is identified whether the attachment and/or the key have other edges in the graph. That is, it is identified whether the attachment is connected to other keys (or data) and/or the key is connected to other attachments (or functions) in the graph. If, at block 904 of FIG. 8, the attachment and/or the key do not have other edges in the graph, then the method proceeds to block 906 of FIG. 8. At block 906 of FIG. 8, the entity 10 (or, more specifically, the processing circuitry 12 of the entity 10) removes from the graph the attachment and/or the key not having other edges in the graph. More specifically, if the removed edge is the only connection of the attachment, then the attachment can be removed from the graph and, similarly, if the removed edge is the only connection of the key, then the key can be removed from the graph.

On the other hand, if, at block 904 of FIG. 8, the attachment and/or the key have other edges in the graph, the method proceeds to block 908 of FIG. 8. At block 908 of FIG. 8, the entity 10 (or, more specifically, the processing circuitry 12 of the entity 10) performs a connected component search (e.g. a breadth first search). The search is performed from the attachment and/or the key, i.e. the vertices, in the graph. At block 910 of FIG. 8, the entity 10 (or, more specifically, the processing circuitry 12 of the entity 10) identifies the number of subgraphs. If, at block 910 of FIG. 8, the number of subgraphs resulting from the removal of the connection between the attachment and key is identified to be one, the method proceeds to 912 of FIG. 8. One subgraph is identified where the attachment is connected to another key in the first group and the key is connected to another attachment in the first group, such that both the attachment and the key remain in the first group following the removal of the connection between them. At 912 of FIG. 8, the entity 10 (or, more specifically, the processing circuitry 12 of the entity 10) can end the method.

On the other hand, if, at block 910 of FIG. 8, the number of subgraphs resulting from the removal of the connection between the attachment and key is identified to be two, the method proceeds to block 914 of FIG. 8. At block 914 of FIG. 8, a new connected component and thus a new group may be created out of the smaller of the two subgraphs.

Figure 9:
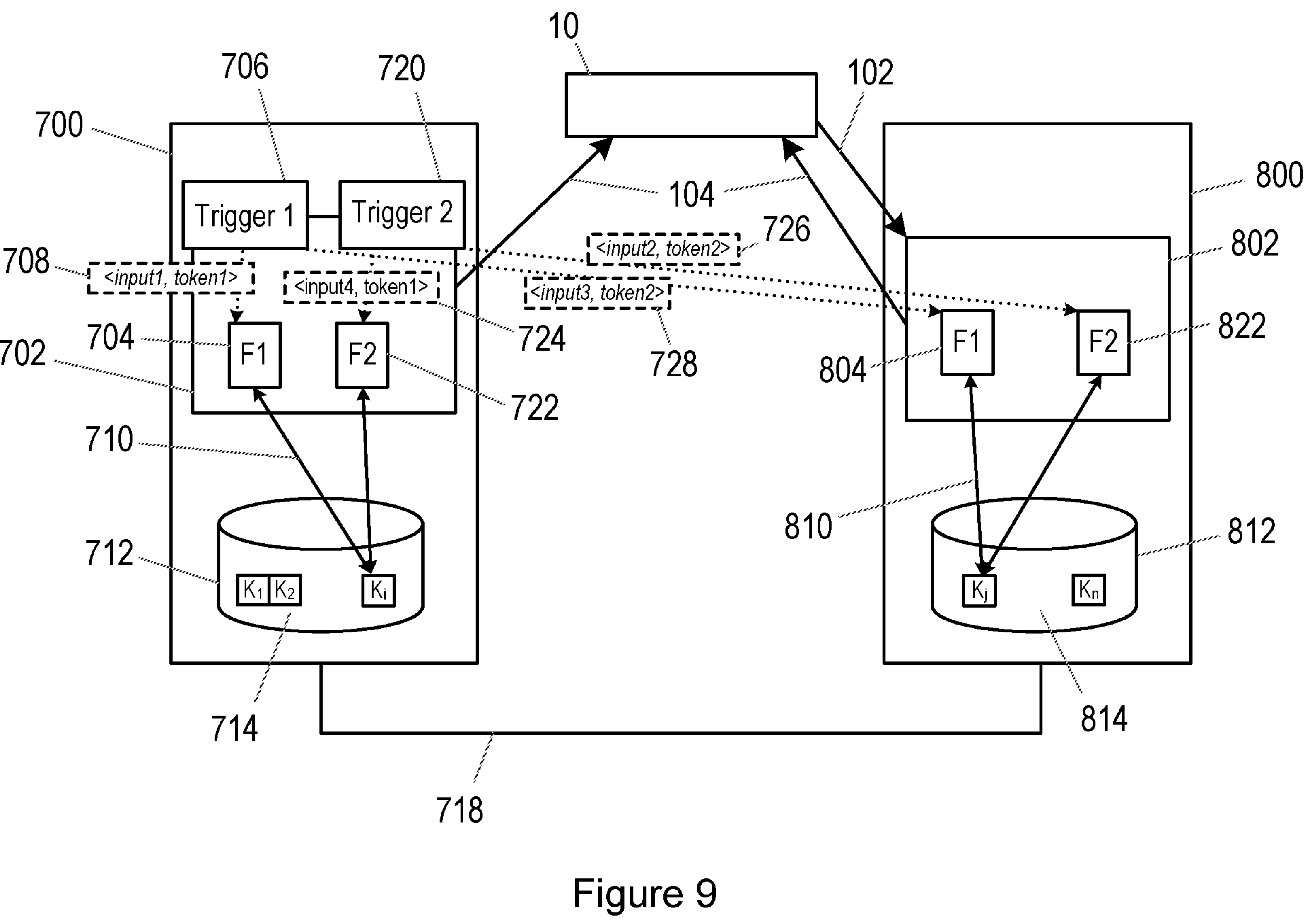
FIG. 9 is a block diagram illustrating an example function-as-a-service system.

FIG. 9 is a block diagram illustrating another example FaaS system. In the example illustrated in FIG. 9, the FaaS system comprises the entity 10 as described earlier and the one or more nodes 700, 800 mentioned earlier. More specifically, in the example illustrated in FIG. 9, the FaaS system comprises a first node 700 and a second node 800. Although the example FaaS system illustrated in FIG. 9 comprises two nodes, it will be understood that the FaaS system referred to herein may comprise any other number of nodes. The entity 10 of the FaaS system illustrated in FIG. 9 may be configured to operate as described earlier in respect of the entity 10 with reference to FIGS. 1 and 2. The first node 700 and/or the second node 800 may be configured to operate as described earlier in respect of the node 20 with reference to FIGS. 3 and 4. As illustrated by the line 718 in FIG. 9, the first node 700 and the second node 800 can communicate, e.g. over a network.

The first node 700 is running a first runtime instance 702. The second node 800 is running a second runtime instance 802. Thus, one or more (e.g. each) node 700, 800 of the FaaS system may host a runtime instance 702, 802 according to some embodiments. A runtime instance 702, 802 can be responsible for executing functions. The FaaS system can execute any function on any of the runtime instances. The first node 700 comprises a first database (or datastore) 712 that is configured to store data 714. The second node 800 comprises a second database (or datastore) 812 that is also configured to store data 814. At the first database 712, the stored data 714 can comprise a plurality of data elements, e.g. a plurality of keys $K_1$, $K_2$, $K_i$. Similarly, at the second database 812, the stored data 814 can comprise a plurality of data elements, e.g. a plurality of keys $K_j$, $K_n$.

The first database 712 and/or the second database 812 can have multiple instances. Thus, one or more (e.g. each) node 700, 800 of the FaaS system may host a database instance according to some embodiments. The instances of the database 712, 812 can enable the functions 704, 722 to store their data and ensure that the functions 704, 722 can run in a stateless manner. In some embodiments where the stored data 714, 814 comprises a plurality of data elements, one or more (e.g. each) of the plurality of data elements may be identified by a unique key across all database instances. In each node 700, 800, the runtime instance 702, 802 and the instances of the database 712, 812 can form their own, separate clusters. In the case of the database 712, 812, the stored data can be distributed between the instances participating in the cluster. The FaaS system may relocate data elements across the instances of the database 712, 812.

In the example illustrated in FIG. 9, a first function (F1) 704 is attached to a first trigger (Trigger 1) 706 and a second function (F2) 722 is attached to a second trigger (Trigger 2) 720. In the example illustrated in FIG. 9, the first function 704 and the second function 722 both use data element $K_i$. In the example illustrated in FIG. 9, the data element $K_i$ is stored on the first node 700.

In some embodiments where functions are attached to triggers, the FaaS system may be an event driven system. A function attached to a trigger makes a trigger-function pair. This trigger-function pair may be referred to herein as an attachment. The first trigger 706 and the second trigger 720 may be different. As mentioned earlier, in some embodiments, a trigger referred to herein (e.g. the first trigger and/or the second trigger referred to herein) may comprise, for example, a hypertext transfer protocol (HTTP) request, a message queue, a database key, a timer, or any other trigger. When a trigger fires, the function attached to the trigger is executed. In some embodiments, the function attached to the trigger may be executed with a given input. During execution of the function, the function may access data, e.g. one or more of the plurality of data elements (e.g. keys). In some embodiments involving an input, the data to be accessed may be derived from the input. In other embodiments, the data to be accessed may be hard coded. The FaaS system may not be aware of the data that is to be accessed by a function before execution of the function (e.g. the FaaS system may only track the accessed data after the function has been executed).

In some embodiments, the same function (code) can be attached to multiple triggers and/or may serve different tasks. From an identification point of view (e.g. when identifying a relation with accessed data), it may be that an attachment is relevant. Thus, it will be understood that the method described herein in respect of a function may instead be performed in respect of an attachment (i.e. a function and its corresponding trigger(s)) according to some embodiments.

In order to optimise performance (e.g. lower function execution latency and/or reach higher throughput) and/or to lower resource usage, the entity 10 described herein groups the first and second functions 704, 722 into a group of functions to be executed on a single one of the nodes 700, 800 of the FaaS system in the manner described earlier. The grouping is based on information from the nodes 700, 800 of the FaaS system. As described earlier, the information is indicative of which functions 704, 722 access which data 714 during execution of the functions 704, 722 and each function 704 of the group accesses the same data 714 as at least one other function 722 of the group. As the information is indicative of which functions 704, 722 access which data 714 during execution of the functions 704, 722, the entity 10 (or, more specifically, the processing circuitry 12 of the entity 10) can identify which functions 704, 722 are using the same data 714 during their executions (e.g. at the moment) and thus create the group of functions comprising one or more functions that access at least some of the same data. As illustrated in FIG. 9, the first function 704 and the second function 722 are located on the same node 700 and thus no movement of functions is needed in this example.

The information indicative of which functions 704, 722 access which data 714 during execution of the functions 704, 722 can be made available to the entity 10 in any suitable way. As illustrated by the arrows 104 of FIG. 9, in some embodiments, the entity 10 may receive the information from the nodes 700, 800 of the FaaS system. Thus, the nodes 700, 800 of the FaaS system may send (or transmit) the information to the entity 10 according to some embodiments. However, it will be understood that, in other embodiments, the entity 10 may remotely access the information at the nodes 700, 800 of the FaaS system. In some embodiments, an execution report may comprise the information indicative of which functions 704, 722 access which data 714 during execution of the functions 704, 722. The execution report may, for example, be generated after each execution of the functions 704, 722. In some embodiments, the execution report may also comprise an execution time for the functions 704, 722, resources used for the execution of the functions and/or statistics on the access of the functions 704, 722. As illustrated by the arrows 710 in FIG. 9, in this example, the first function 704 and the second function 722 locally access data 714 from the first database 712 of the first node 700.

As described earlier and as illustrated by arrow 102 of FIG. 9, in some embodiments, the entity 10 (or, more specifically, the processing circuitry 12 of the entity 10) may initiate transmission of (e.g. itself transmit, such as via a communications interface 16 of the entity 10, or cause another entity to transmit) information indicative of the group of functions towards the single one 700 of the one or more nodes 700, 800 e.g. towards the runtime instance 702 of the single one 700 of the one or more nodes 700, 800. This information can be indicative of the configuration of the group of functions according to some embodiments. As described earlier, the single one 700 of the one or more nodes 700, 800 may execute at least one function 704, 722 of the group of functions. Thus, the functions 704, 722 in the same group are executed on the same node 700.

In some embodiments, as mentioned earlier, the information indicative of the group of functions may comprise a graph in which each function 704, 722 of the group of functions to be executed on the single one 700 of the one or more nodes 700, 800 is connected to data 714 that the function accesses during execution of the function. For example, the entity 10 (or, more specifically, the processing circuitry 12 of the entity 10) may maintain a bipartite graph where the vertices of the graph represent the functions 704, 722 (or function-trigger pairs) and the data 714 (e.g. a plurality of data elements, such as a plurality of keys), and the edges of the graph represent the data accesses. The graph can be (e.g. continuously or periodically) updated by the entity 10 (or, more specifically, the processing circuitry 12 of the entity 10). For example, the graph may be updated based on the information indicative of which functions 704, 722 access which data 714 during execution of the functions 704, 722.

In some embodiments, the entity 10 (or, more specifically, the processing circuitry 12 of the entity 10) may use a connected component concept to represent the functions 704, 722 that access (e.g. are currently working on) the same data 714. In graph theory, a connected component (CC) in an undirected graph is where there exists a path between any two vertices in the graph. In this context, each connected component in the graph can comprise the functions 704, 722 that access (e.g. are currently working on) the same data 714 and that are thus assigned to the same group of functions. In some embodiments, one or more keys used to access the data 714 may also be assigned to the group.

As mentioned earlier, one or more nodes of the FaaS system can provide to the entity 10 information indicative of which functions 704, 722 access which data 714, while the entity 10 can provide to (e.g. the runtime instance 702 of) the single one 700 of the one or more nodes 700, 800 information indicative of the group of functions. In some embodiments, information such as this may be provided in a batch for optimisation purposes. For example, information may be provided in a single message according to some embodiments. In some embodiments, the entity 10 (or, more specifically, the processing circuitry 12 of the entity 10) may store, e.g. in a memory such as a memory of the entity 10 and/or any other memory, the information indicative of the group of functions. In an embodiment where the information indicative of the group of functions comprises a graph, this storage may be implemented in a distributed fashion, e.g. by using a distributed graph database to store the graph.

As mentioned earlier, the data 714 accessed by a function 704, 722 may change over time, which means the number and structure (i.e. constituent functions) of groups of functions may also change. Thus, in some embodiments, a timer may be set to signal that a predefined time period has elapsed since the grouping for a potential update to the grouping to be implemented. For example, in some embodiments, if the timer signals that a predefined time period has elapsed since the grouping and, during the predefined time period, a function of the group of functions to be executed on the single one 700 of the one or more nodes 700, 800 fails to access the same data 714 as at least one other function of the group, the function may be removed from the group. In the graph example, the timer may be set to define a time to live (TTL). For example, each edge in the graph may have a predefined TTL. The TTL can be indicative of a lifetime for the edge and can be used to remove the edge when it is not valid anymore. For example, when the TTL of an edge expires, the edge may no longer be valid and may thus be removed from the graph. The timer can be defined by a user or may be learned (or tuned) through use of machine learning.

In the example illustrated in FIG. 9, the data 714 accessed by the first and second functions 704, 722, of the group of functions to be executed on the single one 700 of the one or more nodes 700, 800 is stored on the single one 700 of the one or more nodes 700, 800. Thus, in some embodiments, the function execution can be co-located with the data storage. In this way, performance can be further optimised (e.g. function execution latency can be further lowered and/or even higher throughput can be reached) and/or resource usage can be further lowered. In some embodiments, the data 714 accessed by the functions 704, 722 of the group of functions may be co-located with the functions either automatically by the database 712 (e.g. based on data access patterns) or via direct configuration (e.g. through an interface between the database 712 and the runtime instance 702 of the node 700).

With reference to FIG. 9, in response to the first trigger 706 on the first node 700 of the FaaS system for execution of the first function 704, execution of the first function 704 is initiated on (e.g. the first runtime instance 702 of) the first node 700 of the FaaS system. Similarly, in response to the second trigger 720 on the first node 700 of the FaaS system for execution of the second function 722, execution of the second function 722 is initiated on (e.g. the first runtime instance 702 of) the first node 700 of the FaaS system. Thus, the execution of the first function 704 is initiated on the same node 700, 800 as the second function 722.

In contrast to FIG. 5, in the example illustrated in FIG. 9, a load generated by execution of the first function 704 and the second function 722 of the group of functions is greater than an available capacity of the single one 700 of the one or more nodes 700, 800. Thus, the entity 10 (or, more specifically, the processing circuitry 12 of the entity 10) initiates generation of a replica 804 of the first function 704 and a replica 822 of the second function 722 to be executed on (e.g. a runtime instance 802 of) another one 800 of the one or more nodes 700, 800. In this way, the first and second functions 704, 722 are served by both (e.g. runtime instances 702, 802 of the) nodes 700, 800. As illustrated by the arrows 810 in FIG. 9, in this example, the replica 804 of the first function 704 and the replica 822 of the second function 722 locally access data 814 from the second database 812 of the second node 800.

In the example illustrated in FIG. 9, execution of the replica 804, 822 of each function 704, 722 of the group of functions is in response to a corresponding trigger 706, 720 on the single one 700 of the one or more nodes 700, 800. Under high load, a function may not be able to handle all of the corresponding triggers and thus the function can be replicated in the manner described. In some embodiments, each trigger 706, 720 can provide a token, which can be associated with data to be accessed by a function 704, 722 (or replica 804, 822 of the function 704, 722) during execution of the function and/or one of the one or more nodes 700, 800 on which the function 704, 722 (or replica of a function 804, 822) is to be executed. In the example illustrated in FIG. 9, the first function 704 executed on the first node 700 has a first input (e.g. value) 708, the second function 722 executed on the first node 700 has a second input (e.g. value) 724, the replica of the second function 822 executed on the second node 800 has a third input (e.g. value) 726, and the replica of the first function 804 executed on the second node 800 has a fourth input (e.g. value) 728. Any one or more of the first input 708, second input 724, third input 726, and fourth input 728 may be different.

In some embodiments, the entity 10 (or, more specifically, the processing circuitry 12 of the entity 10) may guarantee that a trigger with the same token will be consistently executed on the same node, e.g. such that local data access is possible. In some embodiments, if multiple functions are in the same group (and, for example, access the same data), the entity 10 (or, more specifically, the processing circuitry 12 of the entity 10) may scale them in sync. That is, a replica may be generated for each function of the group. In the example illustrated in FIG. 9, the first and second functions 704, 722, are handled together by the same number of runtimes or nodes 700, 800 (two in this example). This may, for example, be the case even if it is only the load generated by execution of one of the functions 704, 722 that needs to be scaled out to more than one node.

In some embodiments, the entity 10 (or, more specifically, the processing circuitry 12 of the entity 10) can validate that, if multiple functions 704, 722 access the same data 714, the tokens of the corresponding triggers 706, 720 are being used consistently. In some embodiments, if at least two functions access the same data using at least two different tokens, the entity 10 (or, more specifically, the processing circuitry 12 of the entity 10) may exclude these functions from being grouped into the same group of functions. In some of these embodiments, the entity 10 (or, more specifically, the processing circuitry 12 of the entity 10) may be configured to generate a warning (e.g. an error message) indicative of at least two functions using mismatched tokens to access the same data.

In this way, if two functions 704, 722 access the same data 712 (e.g. data related to users), it can be ensured that the functions 704, 722 use the same token to access the data 712. This can be useful where data locality needs to be ensured. The distribution (or sharding) of the triggers 706, 720 can happen in sync. For example, triggers for a first user can be executed on the same node 700 for each function 704, 722 of the group. This can make it possible to co-locate the execution of functions with the data for the first user. In some embodiments involving a graph, the entity 10 (or, more specifically, the processing circuitry 12 of the entity 10) may add information relating to the token used by a function 704, 722 to the graph. For example, the information relating to the token can be added to the graph as a property of the edges (i.e. connections) in the graph.

As mentioned earlier, in some embodiments, the information indicative of which functions access which data during execution of the functions may exclude data that is accessed by a predefined number of functions (e.g. a large number of functions, a majority of functions, or all functions) in the FaaS system. The predefined number can be configurable according to some embodiments. In some cases, for example, a function may access the same data (e.g. data element, such as a key) using two different tokens (e.g. if the token holds some global information). Herein, global data (e.g. a global data element, such as a global key) may be defined as data that can be accessed by the same function using different tokens. The co-location of global data cannot be ensured for groups of functions that are scaled out to multiple nodes. Thus, in some embodiments, the entity 10 (or, more specifically, the processing circuitry 12 of the entity 10) may exclude information corresponding to global data when grouping functions into groups. For example, the entity 10 (or, more specifically, the processing circuitry 12 of the entity 10) may not take global data into account when defining a group of functions. This can improve the performance of the FaaS system. In some embodiments, the entity 10 (or, more specifically, the processing circuitry 12 of the entity 10) may (e.g. periodically) generate a report of detected global data. In some embodiments, the functions may be re-designed to avoid using global data.

Figure 10:
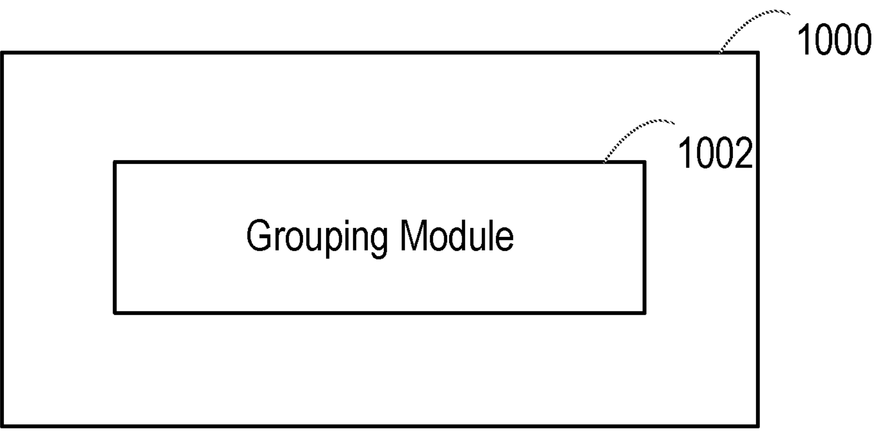
FIG. 10 is a block diagram illustrating an entity according to an embodiment.

FIG. 10 is a block diagram illustrating an entity 1000 for handling execution of functions in a FaaS system in accordance with an embodiment. The FaaS system comprises one or more nodes on which functions are executable. The entity 1000 comprises a grouping module 1002 configured to group functions into a group of functions to be executed on a single one of the one or more nodes. The grouping is based on information from the one or more nodes. The information is indicative of which functions access which data during execution of the functions and each function of the group accesses the same data as at least one other function of the group. The entity 1000 may operate in the manner described herein in respect of the entity.

Figure 11:
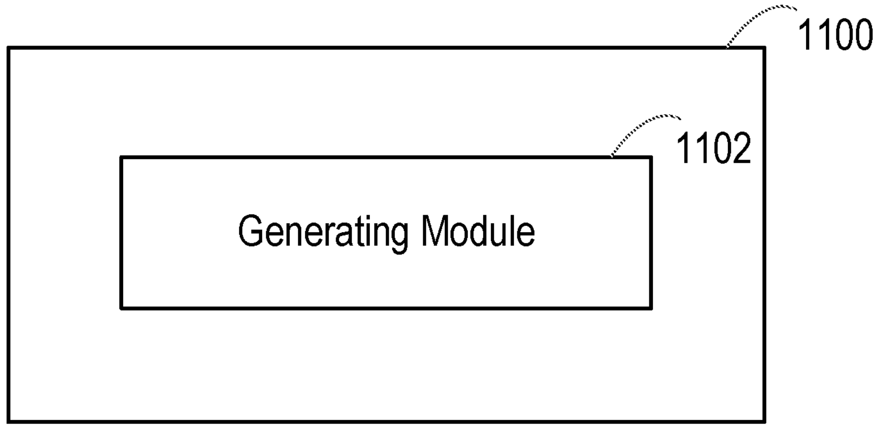
FIG. 11 is a block diagram illustrating a node according to an embodiment.

FIG. 11 is a block diagram illustrating a node 1100 of one or more nodes of a FaaS system to assist an entity with handling execution of functions on the one or more nodes in accordance with an embodiment. The node 1100 comprises a generating module 1102 configured to generate information indicative of which functions access which data during execution of the functions on the node. The generated information is for use by an entity 1000 to group functions into a group of functions to be executed on a single one of the one or more nodes. Each function of the group accesses the same data as at least one other function of the group. The node 1100 may operate in the manner described herein in respect of the node.

There is also provided a computer program comprising instructions which, when executed by processing circuitry (such as the processing circuitry 12 of the entity 10 described earlier and/or the processing circuitry 22 of the node 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the entity 10 described earlier and/or the processing circuitry 22 of the node 20 described earlier) to cause the processing circuitry to perform at least part of the method described herein. There is provided a computer program product comprising a carrier containing instructions for causing processing circuitry (such as the processing circuitry 12 of the entity 10 described earlier and/or the processing circuitry 22 of the node 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the entity functionality and/or node functionality described herein can be performed by hardware. Thus, in some embodiments, the entity described herein can be a hardware entity and/or the node described herein can be a hardware node. However, it will also be understood that optionally at least part or all of the entity functionality and/or node functionality described herein can be virtualised. For example, the functions performed by the entity and/or the node described herein can be implemented in software running on generic hardware that is configured to orchestrate the entity functionality and/or node functionality. Thus, in some embodiments, the entity described herein can be a virtual entity and/or the node described herein can be a virtual node. In some embodiments, at least part or all of the entity functionality and/or node functionality described herein may be performed in a network enabled cloud. The entity functionality and/or node functionality described herein may all be at the same location or at least some of the entity and/or node functionality may be distributed.

It will be understood that at least some or all of the method steps described herein can be automated in some embodiments. That is, in some embodiments, at least some or all of the method steps described herein can be performed automatically. In some embodiments, at least some or all of the method steps described herein may be performed in real-time.

Thus, in the manner described herein, there is advantageously provided an improved technique for handling execution of functions in a FaaS system. The technique can, for example, ensure automatic and dynamic function execution in a FaaS system. A dynamically updated (e.g. graph-based) technique can be used to capture the relationship between function executions and data accessed by those functions to assign the functions to groups. The groups can be provided as configuration feedback to a FaaS platform, so that it can allocate the functions in the group to reach the optimum performance. There is also provided a technique for validating that token information needed for scaling groups to nodes is used consistently.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by an entity for handling execution of functions in a function-as-a-service, FaaS, system, the FaaS system comprising one or more nodes on which functions are executable, the method comprising:

initiating, by the entity, movement of one or more functions of a group of functions to a single one of the one or more nodes such that each function of the group of functions executes on the single one of the one or more nodes, wherein each function of the group accesses the same data as at least one other function of the group;

determining, after a timer signals that a predefined time period has elapsed since a grouping of the functions onto the single one of the one or more nodes, if during the predefined time period, a function of the group of functions fails to access the same data as at least one other function of the group;

where the respective function has not accessed the same data as at least one other function of the group, removing the function from the group;

where a function from one of at least two existing groups of functions accesses the same data as at least one function from another of the at least two existing groups of functions, initiating, by the entity, movement of one or more functions comprising merging the at least two existing groups of functions into the group of functions to be executed on the single one of the one or more nodes, and wherein each function is grouped into the group of functions with one or more triggers, wherein the function is executable in response to the one or more triggers.

2. The method as claimed in claim 1, comprising grouping functions into a group of functions comprising one of:

creating the group of functions to be executed on the single one of the one or more nodes; and assigning at least one function to an existing group of functions to be executed on the single one of the one or more nodes.

3. The method as claimed in claim 1, wherein:

merging the at least two existing groups of functions comprises:

merging the at least two existing groups of functions into the one of the at least two existing groups of functions that comprises the most functions.

4. The method as claimed in claim 1, the method comprising:

in response to an update to the information, updating the grouping based on the updated information.

5. The method as claimed in claim 1, wherein:

the data accessed by each function of the group of functions to be executed on the single one of the one or more nodes, is stored on the single one of the one or more nodes.

6. The method as claimed in a claim 1, the method comprising:

generating information indicative of the group of functions, the information indicative of the group of functions comprising, a graph in which each function of the group of functions to be executed on the single one of the one or more nodes is connected to data that the function accesses during execution of the function.

7. The method as claimed in claim 1, the method comprising:

if a load generated by execution of at least one function of the group of functions is greater than an available capacity of the single one of the one or more nodes:

initiating generation of a replica of the at least one function to be executed on another one of the one or more nodes.

8. The method as claimed in claim 7, the method comprising:

initiating generation of a replica of each function of the group of functions to be executed on the another one of the one or more nodes.

9. The method as claimed in claim 7, wherein:

execution of the replica of each function of the group of functions is in response to the corresponding trigger on the single one of the one or more nodes.

10. The method as claimed in claim 9, wherein:

the trigger provides a token, wherein the token is associated with data to be accessed by one or more of:

the at least one function during execution of the at least one function; and one of the one or more nodes on which the function is to be executed.

11. The method as claimed in claim 1, wherein:

information indicative of which functions access which data during execution of the functions excludes data that is accessed by a predefined number of functions in the Faas system.

12. The method of claim 1 comprising:

generating, by the entity or a further entity, information indicative of which functions access which data during execution of the functions on the node, the generated information being for use by an entity to group functions into a group of functions to be executed on the single one of the one or more nodes.

13. The method as claimed in claim 12, the method comprising:

if a load generated by execution of at least one function of the group of functions is greater than an available capacity of the node:

generating a replica of the at least one function to be executed on another one of the one or more nodes.

14. The method as claimed in claim 13, wherein:

the data accessed by the at least one function of the group of functions is stored on the another one of the one or more nodes.

15. The method as claimed in claim 13, the method comprising:

generating a replica of each function of the group of functions to be executed on the another one of the one or more nodes.

16. The method as claimed in claim 12, wherein:

execution of the replica of each function of the group of functions is in response to the corresponding trigger on the node.

17. The method as claimed in claim 16, wherein:

the trigger provides a token, wherein the token is associated with data to be accessed by one or more of:

the at least one function during execution of the at least one function; and one of the one or more nodes on which the function is to be executed.

18. An entity for handling execution of functions in a function-as-a-service, FaaS, system, the FaaS system comprises one or more nodes on which functions are executable, the entity comprising:

processing circuitry configured to:

initiate movement of one or more functions of a group of functions to a single one of the one or more nodes such that each function of the group of functions executes on the single one of the one or more nodes, wherein each function of the group accesses the same data as at least one other function of the group;

determine, after if a timer signals that a predefined time period has elapsed since a grouping of the functions onto the single one of the one or more nodes, if during the predefined time period, a function of the group of functions fails to access the same data as at least one other function of the group; and where the respective function has not accessed the same data as at least one other function of the group, remove the function from the group;

if a function from one of at least two existing groups of functions accesses the same data as at least one function from another of the at least two existing groups of functions, initiating, by the entity, movement of one or more functions comprises:

merging the at least two existing groups of functions into the group of functions to be executed on the single one of the one or more nodes, and wherein each function is grouped into the group of functions with one or more triggers, wherein the function is executable in response to the one or more triggers.

* * * * *